United States Patent
Cheng et al.

[11] Patent Number: 6,108,101
[45] Date of Patent: Aug. 22, 2000

[54] TECHNIQUE FOR PRINTING WITH DIFFERENT PRINTER HEADS

[75] Inventors: Peter L. Cheng, Newport Beach; Tetsuya Kawanabe; Hiroyuki Ueda, both of Irvine, all of Calif.

[73] Assignee: Canon Kabushiki Kaisha, Tokyo, Japan

[21] Appl. No.: 08/857,186

[22] Filed: May 15, 1997

[51] Int. Cl.⁷ .................................... G06F 15/00
[52] U.S. Cl. .............. 358/1.9; 358/1.8; 347/13; 347/47
[58] Field of Search ................... 395/101, 104, 395/105, 108, 109, 115, 116; 347/13, 24, 42, 43, 47, 172, 174; 399/28, 50, 66, 178

[56] References Cited

U.S. PATENT DOCUMENTS

| | | | |
|---|---|---|---|
| 4,872,027 | 10/1989 | Buskirk et al. | 346/140 |
| 5,049,904 | 9/1991 | Nakamura et al. | 346/140 |
| 5,355,441 | 10/1994 | Kawai et al. | 395/115 |
| 5,600,353 | 2/1997 | Hickman et al. | 347/43 |
| 5,606,355 | 2/1997 | Komatsu | 347/60 |
| 5,854,886 | 12/1998 | MacMillan et al. | 358/1.15 |

FOREIGN PATENT DOCUMENTS 2159992  12/1985  United Kingdom.

*Primary Examiner*—Edward L. Coles
*Assistant Examiner*—Mark Wallerson
*Attorney, Agent, or Firm*—Fitzpatrick, Cella, Harper & Scinto

[57] ABSTRACT

A printing method is provided for use with a printer which reads and then outputs to a printer head a fixed number of bits at a time so as to permit the printer to use a printer head having a number of nozzles which is different than the fixed number of bits. According to this technique, bit data corresponding to an image band to be printed is obtained, the band including multiple pixel arrays, the pixels in each pixel array being arranged in a manner similar to the nozzles in a printer head. In a first loading step, bit data for m pixels of an i-th pixel array are loaded into a register in the printer head, m being a predetermined integer, and i being an arbitrary integer. In a second loading step, bit data for n pixels of an (i+1)-th pixel array are loaded into the register in the printer head, n being a predetermined integer. Finally, the printer head is caused to print an array of dots based on the contents of a register which includes the bit data loaded pursuant to the first and second loading steps, the printed array of dots corresponding to the i-th pixel array.

40 Claims, 19 Drawing Sheets

|   | +16 | +32 | +48 | +64 | +80 | +96 |   |
|---|---|---|---|---|---|---|---|
| 0 | 0 | $Y2_1$ | $Y2_2$ | $Y2_3$ | $Y2_4$ | $Y2_5$ | $Y2_6$ | $Y2_N$ |
| 1 | 0 | $Y3_1$ | $Y3_2$ | $Y3_3$ | $Y3_4$ | $Y3_5$ | $Y3_6$ | $Y3_N$ |
| 2 | 0 | $M1_1$ | $M1_2$ | $M1_3$ | $M1_4$ | $M1_5$ | $M1_6$ | $M1_N$ |
| 3 | 0 | $M2_1$ | $M2_2$ | $M2_3$ | $M2_4$ | $M2_5$ | $M2_6$ | $M2_N$ |
| 4 | 0 | $M3_1$ | $M3_2$ | $M3_3$ | $M3_4$ | $M3_5$ | $M3_6$ | $M3_N$ |
| 5 | 0 | $C1_1$ | $C1_2$ | $C1_3$ | $C1_4$ | $C1_5$ | $C1_6$ | $M3_N$ |
| 6 | 0 | $C2_1$ | $C2_2$ | $C2_3$ | $C2_4$ | $C2_5$ | $C2_6$ | $C2_N$ |
| 7 | 0 | $C3_1$ | $C3_2$ | $C3_3$ | $C3_4$ | $C3_5$ | $C3_6$ | $C3_N$ |
| 8 | X | X | X | X | X | X | X | X |
| 9 | X | X | X | X | X | X | X | X |
| 10 | X | X | X | X | X | X | X | X |
| 11 | X | X | X | X | X | X | X | X |
| 12 | X | X | X | X | X | X | X | X |
| 13 | X | X | X | X | X | X | X | X |
| 14 | X | X | X | X | X | X | X | X |
| 15 | $Y1_1$ | $Y1_2$ | $Y1_3$ | $Y1_4$ | $Y1_5$ | $Y1_6$ | $Y1_7$ | X |

FIG. 8A

|    | +16 | +32 | +48 | +64 | +80 | +96 |  |      |
|----|-----|-----|-----|-----|-----|-----|---|------|
| 0  | X   | X   | X   | X   | X   | X   | X | X    |
| 1  | X   | X   | X   | X   | X   | X   | X | X    |
| 2  | X   | X   | X   | X   | X   | X   | X | X    |
| 3  | X   | X   | X   | X   | X   | X   | X | X    |
| 4  | X   | X   | X   | X   | X   | X   | X | X    |
| 5  | X   | X   | X   | X   | X   | X   | X | X    |
| 6  | X   | X   | X   | X   | X   | X   | X | X    |
| 7  | X   | X   | X   | X   | X   | X   | X | X    |
| 8  | 0   | $B1_1$ | $B1_2$ | $B1_3$ | $B1_4$ | $B1_5$ | $B1_6$ | $B1_N$ |
| 9  | 0   | $B2_1$ | $B2_2$ | $B2_3$ | $B2_4$ | $B2_5$ | $B2_6$ | $B2_N$ |
| 10 | 0   | $B3_1$ | $B3_2$ | $B3_3$ | $B3_4$ | $B3_5$ | $B3_6$ | $B3_N$ |
| 11 | X   | X   | X   | X   | X   | X   | X | X    |
| 12 | X   | X   | X   | X   | X   | X   | X | X    |
| 13 | X   | X   | X   | X   | X   | X   | X | X    |
| 14 | X   | X   | X   | X   | X   | X   | X | X    |
| 15 | X   | X   | X   | X   | X   | X   | X | X    |

| # | Value | |
|---|---|---|
| 0 | X | |
| 1 | 0 | YELLOW (DISABLED) |
| 2 | 0 | |
| 3 | 0 | |
| 4 | 0 | MAGENTA |
| 5 | 0 | |
| 6 | 0 | |
| 7 | 0 | CYAN |
| 8 | 0 | |
| 9 | 0 | |
| 10 | 0 | |
| 11 | 0 | |
| 12 | 0 | BLACK (DISABLED) |
| 13 | 0 | |
| 14 | 0 | |
| 15 | 0 | |
| 16 | $Y1_1$ | |

FIG. 9B

| # | Value | |
|---|---|---|
| 0 | $Y1_1$ | |
| 1 | $Y2_1$ | YELLOW |
| 2 | $Y3_1$ | |
| 3 | $M1_1$ | |
| 4 | $M2_1$ | MAGENTA |
| 5 | $M3_1$ | |
| 6 | $C1_1$ | |
| 7 | $C2_1$ | CYAN |
| 8 | $C3_1$ | |
| 9 | 0 | |
| 10 | 0 | |
| 11 | 0 | |
| 12 | 0 | BLACK (DISABLED) |
| 13 | 0 | |
| 14 | 0 | |
| 15 | 0 | |
| 16 | $Y1_2$ | |

FIG. 9C

| # | Value | |
|---|---|---|
| 0 | $Y1_2$ | |
| 1 | $Y2_2$ | YELLOW |
| 2 | $Y3_2$ | |
| 3 | $M1_2$ | |
| 4 | $M2_2$ | MAGENTA |
| 5 | $M3_2$ | |
| 6 | $C1_2$ | |
| 7 | $C2_2$ | CYAN |
| 8 | $C3_2$ | |
| 9 | 0 | |
| 10 | 0 | |
| 11 | 0 | |
| 12 | 0 | BLACK (DISABLED) |
| 13 | 0 | |
| 14 | 0 | |
| 15 | 0 | |
| 16 | $Y1_3$ | |

| Index | Value | Group |
|---|---|---|
| 0 | X | YELLOW (DISABLED) |
| 1 | 0 | |
| 2 | 0 | |
| 3 | 0 | MAGENTA |
| 4 | 0 | |
| 5 | 0 | |
| 6 | 0 | CYAN |
| 7 | 0 | |
| 8 | 0 | |
| 9 | $B1_N$ | BLACK |
| 10 | $B2_N$ | |
| 11 | $B3_N$ | |
| 12 | 0 | |
| 13 | 0 | |
| 14 | 0 | |
| 15 | 0 | |
| 16 | 0 | |

FIG. 10A

| Index | Value | Group |
|---|---|---|
| 0 | 0 | YELLOW (DISABLED) |
| 1 | 0 | |
| 2 | 0 | |
| 3 | 0 | MAGENTA |
| 4 | 0 | |
| 5 | 0 | |
| 6 | 0 | CYAN |
| 7 | 0 | |
| 8 | 0 | |
| 9 | $B1_{N-1}$ | BLACK |
| 10 | $B2_{N-1}$ | |
| 11 | $B3_{N-1}$ | |
| 12 | 0 | |
| 13 | 0 | |
| 14 | 0 | |
| 15 | 0 | |
| 16 | 0 | |

FIG. 10B

|     | +16 | +32 | +48 | +64 | +80 | +96 | +112 | +128 |
| --- | --- | --- | --- | --- | --- | --- | --- | --- |
| 0   | X | X | X | X | X | X | X | X |
| 1   | X | X | X | X | X | X | X | X |
| 2   | X | X | X | X | X | X | X | X |
| 3   | X | X | X | X | X | X | X | X |
| 4   | X | X | X | X | X | X | X | X |
| 5   | X | X | X | X | X | X | X | X |
| 6   | X | X | X | X | X | X | X | X |
| 7   | X | X | X | X | X | X | X | X |
| 8   | $B1_1$ | $B1_2$ | $B1_3$ | $B1_4$ | $B1_5$ | $B1_6$ | $B1_7$ | $B1_8$ | $B1_9$ |
| 9   | $B2_1$ | $B2_2$ | $B2_3$ | $B2_4$ | $B2_5$ | $B2_6$ | $B2_7$ | $B2_8$ | $B2_9$ |
| 10  | $B3_1$ | $B3_2$ | $B3_3$ | $B3_4$ | $B3_5$ | $B3_6$ | $B3_7$ | $B3_8$ | $B3_9$ |
| 11  | $B4_1$ | $B4_2$ | $B4_3$ | $B4_4$ | $B4_5$ | $B4_6$ | $B4_7$ | $B4_8$ | $B4_9$ |
| 12  | $B5_1$ | $B5_2$ | $B5_3$ | $B5_4$ | $B5_5$ | $B5_6$ | $B5_7$ | $B5_8$ | $B5_9$ |
| 13  | $B6_1$ | $B6_2$ | $B6_3$ | $B6_4$ | $B6_5$ | $B6_6$ | $B6_7$ | $B6_8$ | $B6_9$ |
| 14  | $B7_1$ | $B7_2$ | $B7_3$ | $B7_4$ | $B7_5$ | $B7_6$ | $B7_7$ | $B7_8$ | $B7_9$ |
| 15  | $B8_1$ | $B8_2$ | $B8_3$ | $B8_4$ | $B8_5$ | $B8_6$ | $B8_7$ | $B8_8$ | $B8_9$ |

1 BIT
8 BITS

FIG. 12

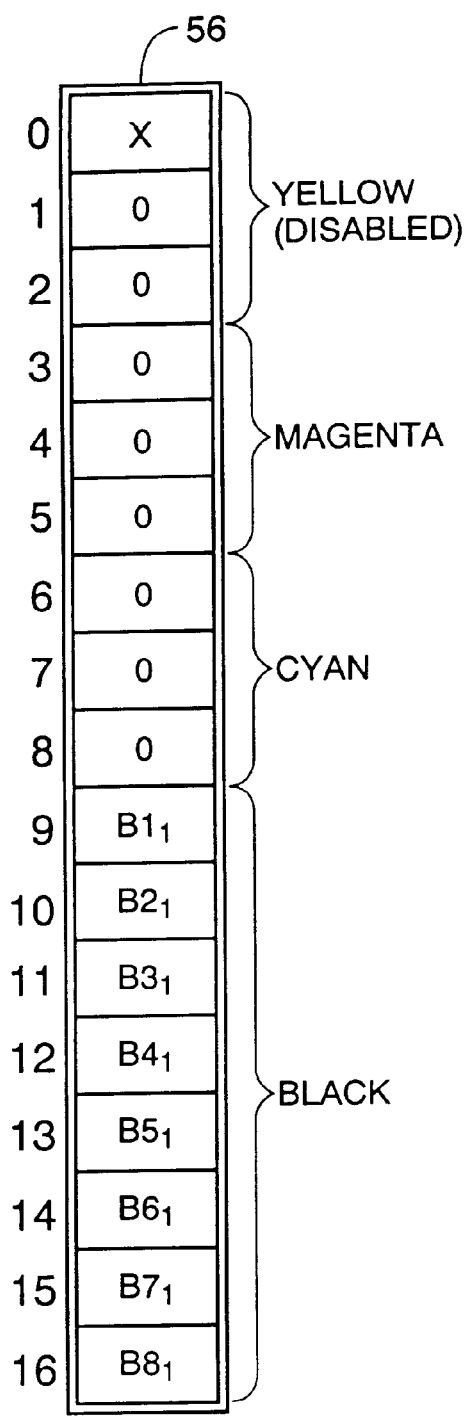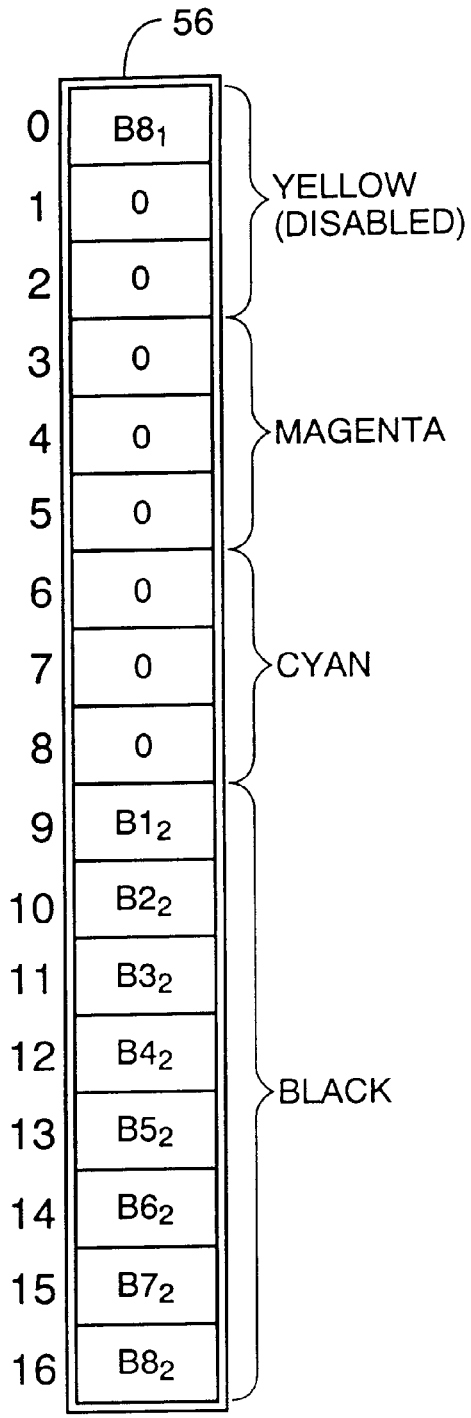
FIG. 13A  FIG. 13B

TECHNIQUE FOR PRINTING WITH DIFFERENT PRINTER HEADS

BACKGROUND OF THE INVENTION

1. Field of the Invention

The present invention relates to printing techniques, and specifically to a printing technique which can be used by a printer which is only capable of outputting to a printer head a fixed number of bits at a time so as to enable the printer to print using printer heads having different numbers of nozzles.

2. Description of the Related Art

Printers are frequently designed to be compatible only with a specific type of printer head. For example, a printer which is meant for use with a 128 nozzle ink jet printer head typically would have a random access memory (RAM) buffer which is sized to accommodate only enough image data to enable printing of an image band 128 pixels (each pixel having a binary value) high. Even more importantly, the circuitry of the printer typically would be constructed to read from the buffer, and to output to the printer head, only 128 bits at a time.

A specific example of a conventional printing technique for printing at 360 dots/inch using only black ink will now be described in more detail with reference to FIGS. 1, 2A, 2B and 2C. FIG. 1 illustrates a functional block diagram of hardware used to implement the conventional technique. According to FIG. 1, a CPU 1, executing instructions contained in a programmable read-only memory (PROM) 2, first obtains and then stores into a print buffer in RAM 3 a bit map of image data for an image band to be printed.

A graphical depiction of a portion of the print buffer is illustrated in FIG. 2A. As shown in FIG. 2A, the print buffer is 128 bits high and, in order to print 8.2 inches across a page at a resolution of 360 dots/inch, is 2,952 bits wide. Structurally, RAM 3 is organized as a series of data bytes, each having a separate address. Thus, for example, the first column of the print buffer corresponds to bytes 0–15 in RAM 3, counting from top to bottom, the second column corresponds to bytes 16–31, the third column to bytes 32–47.

In this conventional printing technique, once the print buffer has been loaded with the desired bit map image, the arrangement of the image data in the print buffer matches exactly the arrangement of image data in the image band to be printed. Therefore, as depicted in FIG. 2A, the arrangement of print data in the print buffer also corresponds exactly to the manner in which dots are to be printed on the output page. As a result, the printer's function is to cause an ink dot to be printed in a band on an output page at each location spatially corresponding to each bit location in the print buffer that has a value of 1. Similarly, the printer will suppress printing a dot for each location corresponding to a 0 value. By printing in this manner, a band 8.2 inches wide and $128/360$ inches high will be printed on an output sheet of paper. After one band has been printed, the procedure is simply repeated for the number of bands required to print the entire page.

In order to effect printing of the data in the print buffer as described above, a gate array 4 first reads a 128 bit data sequence out of the print buffer. In this regard, gate array 4 can be instructed to read the bit data sequence according to one of several predetermined patterns. The actual pattern selected in this particular case will depend upon the configuration of the nozzles in the printer head. Specifically, if the nozzles in the printer head to be used are arranged in a single vertical column, the bit data sequence pattern would correspond to a single column of the print image buffer, such as column 11 (bytes 0–15, containing $B1_1$–$B16_1$), column 12 (bytes 16–31, containing $B1_2$–$B16_2$), or column 13 (bytes 32–47, containing $B1_3$–$B16_3$), as shown in FIG. 2A.

Alternatively, the nozzles in the printer head to be used might be arranged in a staircase pattern. In this case, gate array 4 will be instructed to read the bit data sequence from the print buffer in a staircase pattern, such as staircase patterns 16 and 17 shown in FIG. 2B, in order to accurately reproduce the contents of the print buffer on paper. Thus, for example, one bit data sequence read by gate array 4 (corresponding to staircase pattern 16) would include bytes 0, 1, 18, 19, 36, 37, 54, 55, 72, 73, 90, 91, 108, 109, 126 and 127 (containing $B1_1$, $B2_1$, $B3_2$, $B4_2$, $B5_3$, $B6_3$, $B7_4$, $B8_4$, $B9_5$, $B10_5$, $B11_6$, $B12_6$, $B13_7$, $B14_7$, $B15_8$ and $B16_8$). A slightly different staircase pattern which can be read by gate array 4 is illustrated in FIG. 2C.

For purposes of the following discussion, it will be assumed that the printer head 5 has 128 black nozzles arranged in a single vertical column, and that gate array 4 is instructed to read one column at a time from the print buffer (i.e., according to the pattern shown in FIG. 2A).

After reading a full column of data from the print buffer, gate array 4 automatically performs a masking function which masks the bits of an input bit data sequence in one byte units according to an input masking word. Specifically, gate array 4 receives as an input a 16 bit masking word, with each bit in the masking word corresponding to one byte of the input bit data sequence. The masking operation is performed each time a bit data sequence is read in by ANDing each bit in each byte of the input bit data sequence with the bit corresponding to that byte in the masking word. For convenience, throughout this specification, data in the input bit data sequence often will be referred to in one byte blocks numbered from 0 to 15.

Thus, if bit 0 of the masking word has a value of 0 and bit 1 has a value of 1, then each bit in byte 0 of the input bit data sequence is forced to zero while each bit in byte 1 of the input bit data sequence remains unaltered. This masking function permits printing of a partial band without the necessity of overwriting portions of the print buffer with zeroes. Printing such a partial band might be desirable, for example, when printing a page which requires a non-integer number of bands.

Upon completion of the masking operation, gate array 4 serially outputs the sequence of bit data into printer head 5. More specifically, gate array 4 outputs the bit data into a shift register 6 in the printer head 5. For example, if column 11 shown in FIG. 2A had been read, gate array 4 would serially transfer each bit from each consecutive byte beginning with byte 0 and ending with byte 15.

After the entire 128 bit data sequence has been loaded into shift register 6, a latch signal 7b is provided by gate array 4 to cause the shift register data to be latched into a latch register 9 in the printer head 5.

Finally, gate array 4 sends heat profile signal 7d, providing heating pulses to cause a printer nozzle to eject a dot of ink, and timing control signals 7c, for controlling the printing timing for each nozzle, to the printer head 5. In addition, each nozzle in the printer head 5 has associated with it one bit in latch register 9, and is caused to print an ink dot only if its associated bit has a value of 1. Thus, when the latch register 9 has been loaded with bytes 0 to 15, the top eight nozzles in printer head 5 correspond to the bits in byte 0 of the latch register, and the bottom eight nozzles correspond to byte 15. Accordingly, the printed array of dots will correspond to the bit pattern in column 11 of the print buffer.

The foregoing process is repeated for each sequence of bit data in the print buffer as the printer head is moved across a page, thereby causing the entire image band represented by the contents of the print buffer to be printed. Thus, referring to FIG. 2A, columns 11, 12, 13, and so on would be printed in sequence, with the printer head 5 moving 1/360 inch between columns.

It may be desirable to use a recording apparatus which records in this manner, and which is designed to use a particular type of printer head (i.e., 128 nozzle all-black) with a different type of printer head (i.e., 136 nozzle color). A problem arises, however, due to the fixed size of the print buffer and the fact that the gate array is only designed to read and output 128 bits at a time. This means that one printer head cannot simply be substituted for another. Owing to the constraints of the head and apparatus design, it is difficult to use the foregoing printer with a printer head having more than 128 nozzles. In particular, with respect to a printer head which loads serial print data into a shift register, as described above, merely loading 128 bits into a printer head having more than 128 nozzles (and consequently, more than 128 bits in its shift register) would cause the remainder of the shift register positions to have indeterminate values, thereby resulting in uncertain printing results.

One solution to the foregoing problem of printing using a printer head of a type/size other than that for which the device was intended would be to replace the hardware elements (such as the RAM 3 and the gate array 4) that are specifically tailored to match a particular printer head. However, this solution also has problems. First, the required changes generally would be difficult and expensive. Second, after these changes had been made, the printer often still would be customized to work with only a single, albeit different, printer head.

Thus, there exists a genuine need for a printing technique which allows a given recording apparatus designed for use with a particular type of printer head to use a printer head of a different type.

SUMMARY OF THE INVENTION

It is therefore an object of the present invention to provide a printing technique which can permit a printer, which is only capable of reading from a print buffer, and outputting to a printer head, a fixed number of bits at a time, to print using a printer head having a number of nozzles that is different than that fixed number of bits.

Thus, according to one aspect of the invention, a printing method is provided for use with a printer which reads and then outputs to a printer head a fixed number of bits at a time so as to permit the printer to use a printer head having a number of nozzles which is different than the fixed number of bits. According to this technique, bit data corresponding to an image band to be printed is obtained, the band including multiple pixel arrays, the pixels in each pixel array being arranged in a manner similar to the nozzles in a printer head. In a first loading step, bit data for m pixels of an i-th pixel array are loaded into a register in the printer head, m being a predetermined integer, and i being an arbitrary integer. In a second loading step, bit data for n pixels of an (i+1)-th pixel array are loaded into the register in the printer head, n being a predetermined integer. Finally, the printer head is caused to print an array of dots based on the contents of a register which includes the bit data loaded pursuant to the first and second loading steps, the printed array of dots corresponding to the i-th pixel array.

By virtue of the foregoing arrangement, print data can be loaded into a printer head and printed so as to accurately reproduce a band of print image data using a printer head having a different number of nozzles than the printer head for which the printer was originally designed. More specifically, the foregoing arrangement can permit a printer which reads and outputs data in fixed bit data sequence lengths to print using a printer head having a different number of nozzles than the number of bits in the bit data sequence. In one representative embodiment described below, the present invention enables a printer having a gate array which is only capable of reading and outputting 128 bits at a time to print in either a color image mode or a black-only (monochrome) image mode using a 136 nozzle color printer head, and to accomplish this with only minimal hardware modifications.

According to another aspect of the invention, a printing apparatus is provided in which input means receives input image data, and detection means detects whether a printer head is a monochrome or a color printer head. Color-to-black translation means translates color image data into monochrome image data, with control means controlling the color-to-black translation means to translate the input image data only if the input image data is color image data and the detection means has detected a monochrome printer head.

By virtue of the foregoing arrangement, a printer can adapt to a specific printer head being used, thereby permitting good reproduction of image data.

According to another aspect of the invention, a printing apparatus for use with an all-black printer head having a predetermined number of nozzles and a color printer head having more than the predetermined number of nozzles, is provided in which control means outputs print data for up to the predetermined number of nozzles. Disabling means disables at least one printer head nozzle so as to enable printing with a printer head having more than the predetermined number of nozzles.

By virtue of the foregoing arrangement, print data can be loaded into a printer head and printed so as to accurately reproduce a band of print image data using a printer head having a different number of nozzles than the printer head for which the printer was originally designed. More specifically, the foregoing arrangement can permit a printer which reads and outputs data in fixed bit data sequence lengths to print using a printer head having a different number of nozzles than the number of bits in the bit data sequence.

This brief summary has been provided so that the general nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 8A graphically depicts the arrangement of image data in the print buffer for a color pass of a color printing mode according to the first embodiment of the invention.

FIG. 8B graphically depicts the arrangement of image data in the print buffer for a black pass of a color printing mode according to the first embodiment of the invention.

FIGS. 9A through 9C illustrate the contents of a printer head shift register after loading the first three bit data sequences, respectively, in the print buffer during a color pass of a color printing mode of the first embodiment.

FIGS. 10A and 10B illustrate the contents of a printer head shift register after loading the first two bit data sequences, respectively, for a black pass of a color printing mode according to the first embodiment.

FIG. 12 graphically depicts the contents of the print buffer for an all-black printing mode according to the first embodiment of the invention.

FIGS. 13A and 13B illustrate the contents of the printer head shift register after loading the first two bit data sequences, respectively, in the print buffer during all-black printing of the first embodiment.

DETAILED DESCRIPTION OF THE PREFERRED EMBODIMENTS

Figure 3:
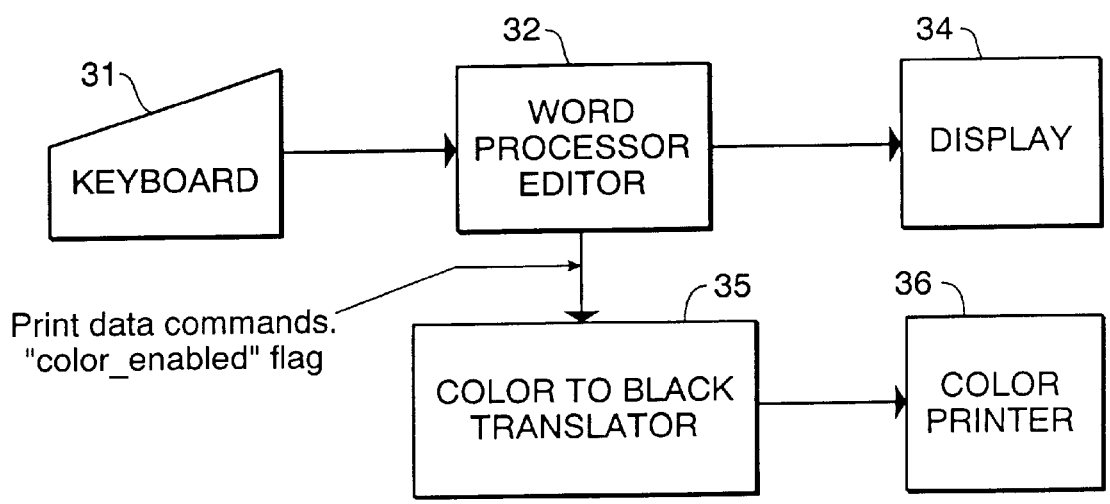
FIG. 3 is a functional block diagram of a personal publishing system in which a printer utilizing a printing technique according to the present invention can be used.

FIG. 3 shows a functional block diagram of a system incorporating a printer utilizing a printing technique according to the present invention. The system shown in FIG. 3 is a personal publishing system which includes an integrated keyboard, processor, display and color printer. Specifically, referring to FIG. 3, using keyboard 31, a user inputs information for creating and editing a document into word processor editor 32. While the document is being created and modified, word processor editor 32 outputs data to a display 34 which in turn creates a screen image to provide the user with information indicating how the document would look if printed. When the user is satisfied with the displayed document, the user enters a print instruction from keyboard 31.

In addition, the user can supply an instruction as to whether the document should be printed in color or in black ink only. Preferably, however, the color/black only decision is made automatically based on the type of image data generated and a result of a detection by color printer 36 as to the type of printer head which is installed. More preferably, each printer head to be installed (including a 128 nozzle all-black and a 136 nozzle color printer head) has a number of electrical terminals which are available for printer head identification.

By sensing the status of those terminals (e.g., by sensing whether each terminal is high or low), printer 36 can detect the type of the printer head. Then, if the printer head is identified as black only (such as the 128 nozzle all-black printer head) and the generated image data contains color image data, the processor would control color-to-black translator 35 to translate, using a conventional translation technique, the color image data output by word processor editor 32. As a result, only black image data would be output from color-to-black translator 35, even though the application program contains some color image data.

If, on the other hand, a color printer head (such as a 136 nozzle color printer head) is detected, or if word processor editor 32 only outputs black image data, then color to black translation is not required. Accordingly, in these cases color-to-black translator 35 is controlled to simply pass through the image data produced by word processor editor 32.

As a result of the foregoing processing, if a black-only printer head is installed in color printer 36, color printer 36 is automatically provided with only black image data regardless of the output of word processor editor 32. However, if a color printer head is installed, color image data output by word processor editor 32 is printed normally.

It should be noted that the present invention is not limited to the foregoing system, but might be implemented on a stand alone printer, such as a printer connected to a personal computer. In addition, other programs, such as graphics and spreadsheet programs, can be used to generate image data to be printed.

As is apparent from the foregoing discussion, it is highly desirable that color printer 36 be capable of printing both full color and black-only information. It also is generally desirable that color printer 36 be capable of operating in separate full color and black-only modes, with each mode specifically designed to efficiently print its respective type of image information.

[First Embodiment]

A representative first embodiment of the present invention will now be described. This first embodiment provides a printing technique which can be used with gate array 4 shown in FIG. 1 to enable printing using a 136 nozzle color printer head printing Y (yellow), M (magenta), C (cyan) and B (black) inks.

Figure 1:
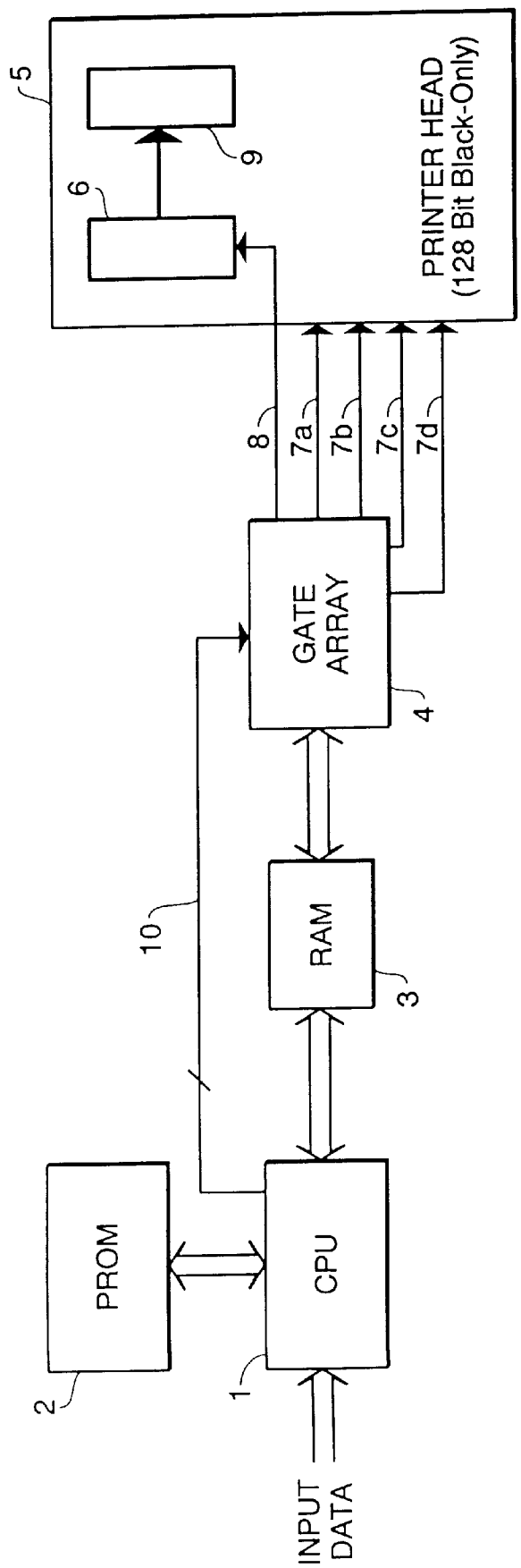
FIG. 1 is a functional block diagram of hardware for printing with a 128 bit all-black (monochrome) printer head.
Figure 4:
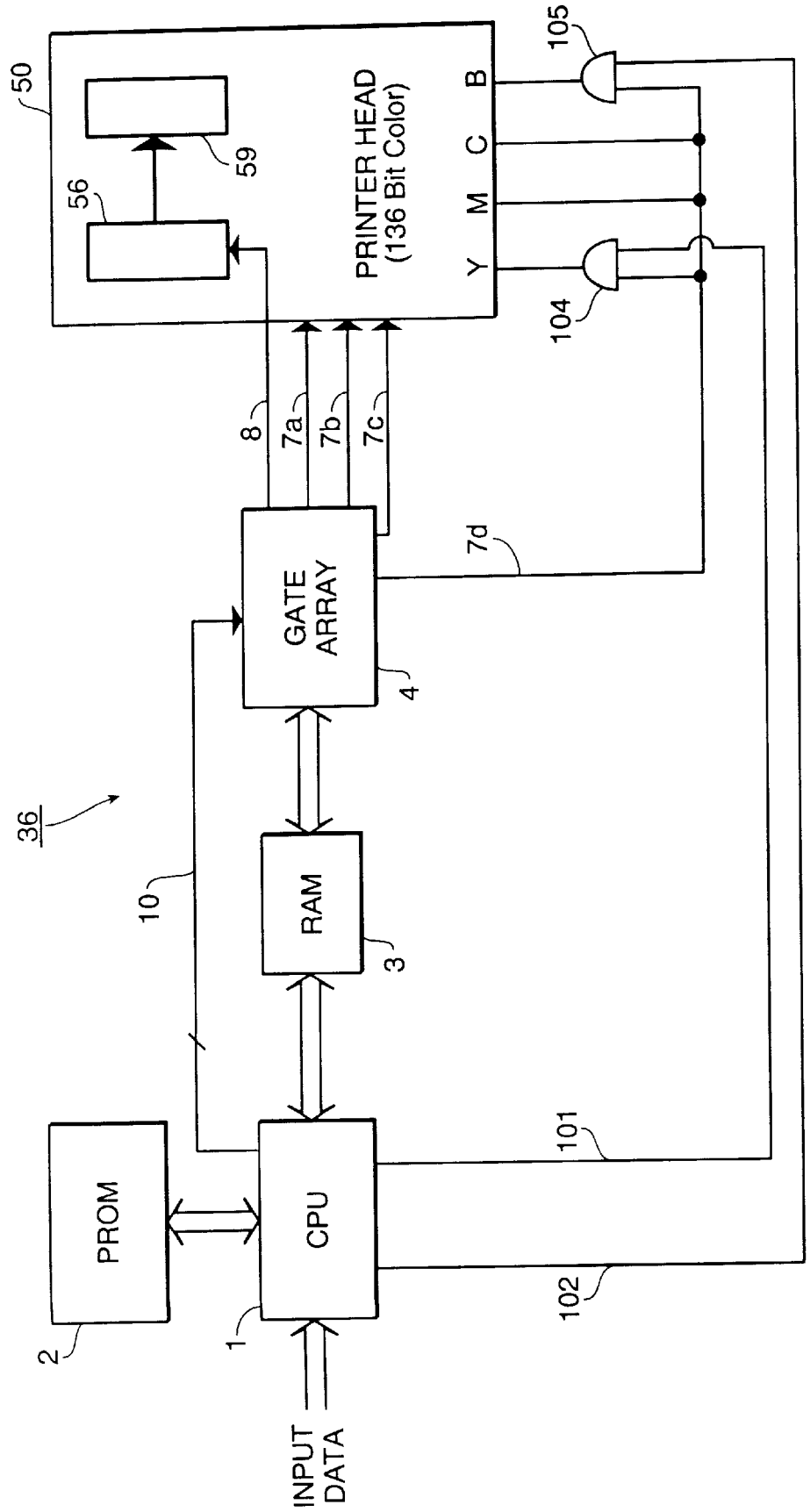
FIG. 4 is a functional block diagram of the printer shown in FIG. 3.

FIG. 4 is a functional block diagram of printer 36 shown in FIG. 3. Elements which are the same as those shown in FIG. 1 are numbered in like manner. Any conventional means for implementing the signal connections shown in FIG. 4 may be used. For example, CPU 1, PROM 2, RAM 3 and gate array 4 might communicate through a common system bus.

Referring to FIG. 4, CPU 1 provides address data to PROM 2. In response, PROM 2 outputs codes indicating executable instructions to CPU 1. In addition, CPU 1 provides control signals 10 (including starting address, pattern selection and masking word signals) to gate array 4, and provides image data and address information, indicating where to store the image information, to RAM 3. In the present embodiment, two additional output pins of CPU 1 have been utilized to provide two more control signals, a yellow enable signal 101 and a black enable signal 102.

Gate array 4 provides address information to RAM 3, and in response RAM 3 outputs image data to gate array 4. Gate array 4 also outputs serial image data 8, clock signal 7a, latch signal 7b, and timing control signals 7c to printer head 50. Finally, gate array 4 outputs heat profile signal 7d.

Figure 5:
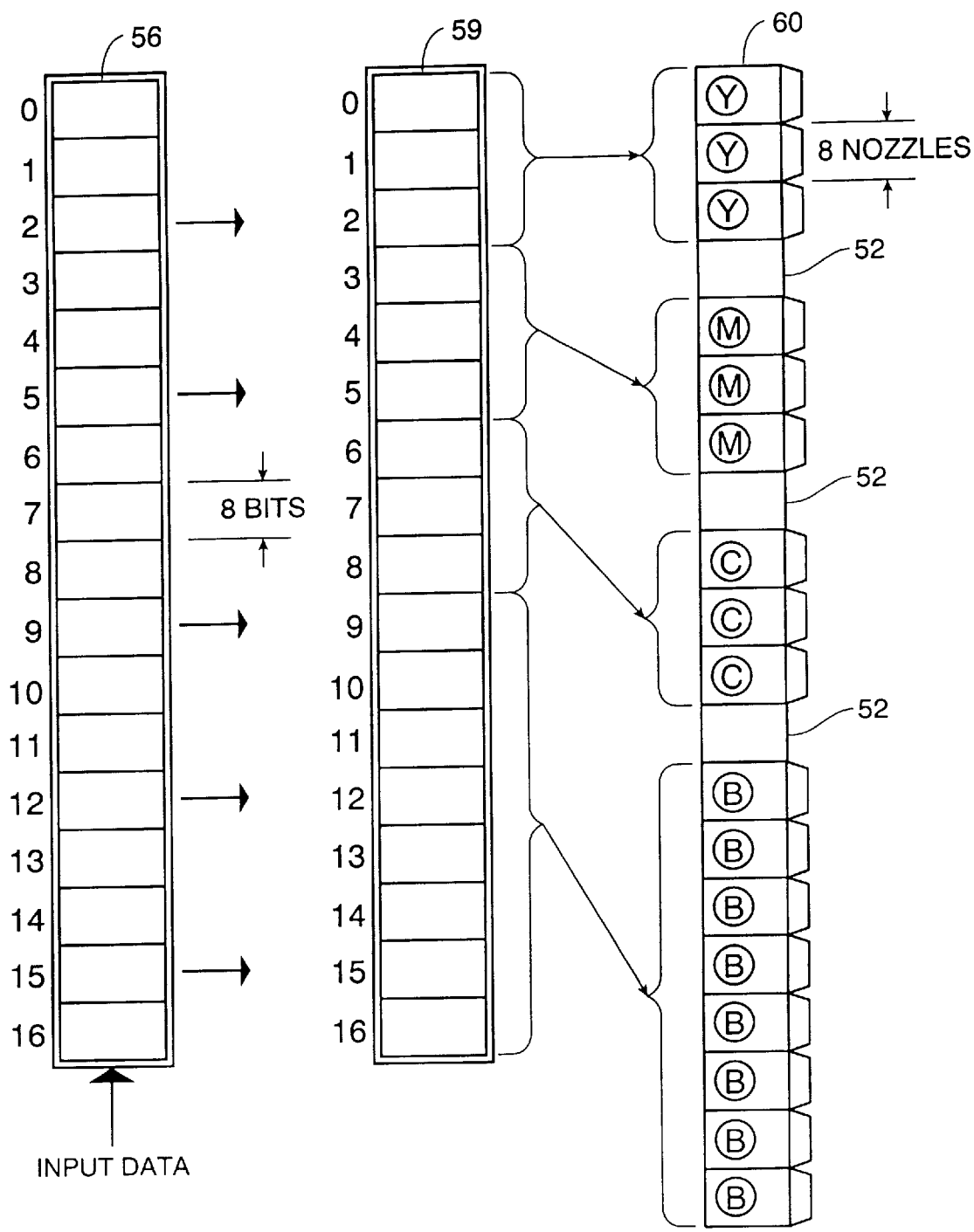
FIG. 5 graphically depicts the shift register, latch register, and nozzle array for a 136 bit color printer head.

The architecture of color printer head 50 is similar to that of printer head 5 in FIG. 1. That is, color printer head 50 also has an internal shift register 56, a latch register 59 and an array of print nozzles 60. However, as shown in FIG. 5, shift register 56 and latch register 59 of color printer head 50 have 136 bits positions (labelled bytes 0 to 16), and array of nozzles 60 includes 136 nozzles. Printer head 50 also has two electrical terminals for printer head identification discussed above.

More specifically, nozzle array 60 includes 24 yellow nozzles, 24 magenta nozzles, 24 cyan nozzles and 64 black nozzles, arranged in that order. Between each group of nozzles for a particular color and the nozzle group for the next color is a gap 52 equal in length to the length of a column of eight nozzles. Each nozzle in nozzle array 60 corresponds to a bit in latch register 59. Thus, the first eight yellow nozzles correspond to byte 0 in the latch register, the first eight magenta nozzles correspond to byte 3, the first eight cyan nozzles correspond to byte 6, and the first eight black nozzles correspond to byte 9. Like the 128 nozzle black-only printer head, in color printer head 50 a nozzle will only print an ink dot if its corresponding bit in latch register 59 has a value of 1.

As a result of its configuration, printer head 50 is capable of printing in a single pass of printer head 50 across the page a sub-band of yellow 24 pixels high, a sub-band of magenta 24 pixels high, a sub-band of cyan 24 bits high, and a sub-band of black 64 pixels high with a gap equivalent to 8 pixels high between each. However, during color printing typically only 24 of the black nozzles are used, with the full 64 black nozzles generally only being used for all-black printing.

As shown in FIG. 4, printer head 50 also has four input terminals, Y, M, C and B which separately input heat profile signals for each of the yellow, magenta, cyan and black nozzles, respectively. Specifically, heat profile signal 7d is provided directly to the M and C terminals of printer head 50. In addition, heat profile signal 7d is ANDed with yellow enable signal 101 from CPU 1 in AND gate 104, and the result of the ANDing operation is provided to the Y terminal of printer head 50. Similarly, heat profile signal 7d is ANDed with black enable signal 102 in AND gate 105, and the result is provided to the B terminal of printer head 50. Of course, as mentioned above, even with heat profile signals applied to the Y, M, C and B terminals of printer head 50, each individual nozzle will only print a dot if its corresponding latch register bit is set to 1.

Printer 36 first detects the type of printer head installed. If the printer head is 128 bit all-black, then CPU 1 will provide all-black data. As noted above, using color-to-black translator 35, all-black data will be provided regardless of whether a specific application initially creates color or all-black image data. Accordingly, 128 bit all-black printing can be performed using conventional techniques. On the other hand, if printer 36 detects that a 136 bit color printer head is installed, then CPU 1 will perform printing in a color mode if the application provides color image data, or will print in an all-black mode if the application provides all-black image data.

Figure 7:
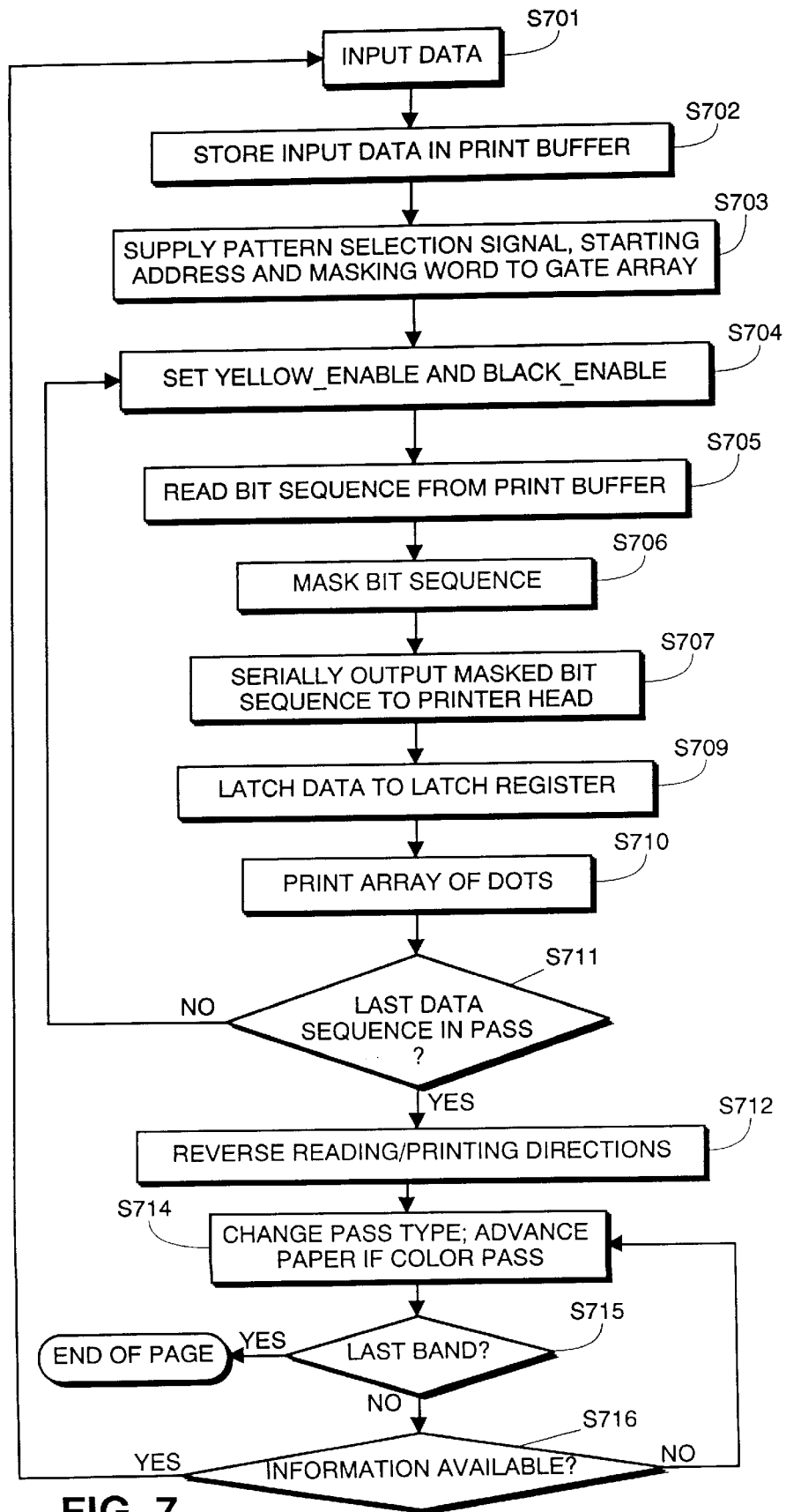
FIG. 7 is a flow diagram showing color mode processing according to the first embodiment of the present invention.

The operation of the apparatus depicted in FIG. 4, printing in a color mode according to the present invention, will now be discussed with reference to the flow diagram in FIG. 7.

Briefly, an image band, consisting of yellow, magenta and cyan sub-bands, is initially input and stored in a specific manner into a print buffer. A gate array then reads a bit data sequence corresponding to a column of the print buffer, masks the bit data sequence according to a predetermined masking word, and serially outputs the masked data to a shift register in the printer head. The bit data is then latched to a latch register, and an array of dots corresponding to the yellow, magenta and cyan data is printed. The foregoing steps are repeated for each column of the print buffer. When the end of the print buffer is reached, if black image data is present, the print buffer is loaded with data corresponding to a band of black image data, and the black image data is then read from the print buffer in a similar manner so as to print the band of black image data. Additional bands (alternating between color and black) are input and printed in this manner to print the entire page.

Figure 6:
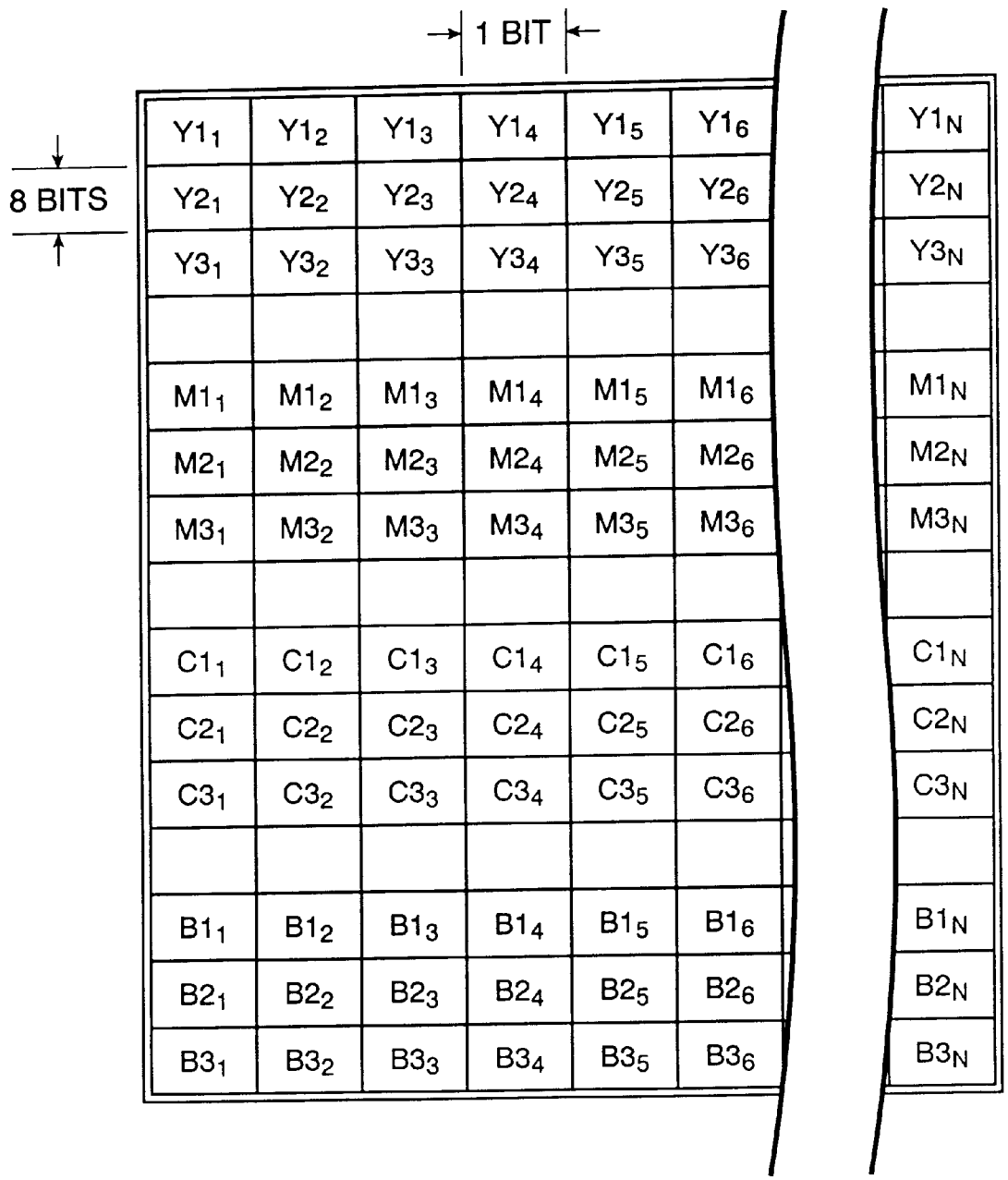
FIG. 6 illustrates the structure of an image band to be printed.

More specifically, in step S701, CPU 1 inputs a band of image data to be printed, such as from word processing application. Alternatively, CPU 1 might simply read data codes (such as ASCII codes or page description language) from memory (such as another portion of RAM 3) and convert that data into bit map data to be printed. In the color printing mode, due to the configuration of nozzles in printer head 50, a bit map image for a combined color and black image band which is desired to be printed is as shown in FIG. 6. As depicted in FIG. 6, the desired bit map image includes a sub-band of yellow 24 pixels high, a sub-band of magenta 24 pixels high, and a sub-band of cyan 24 pixels high, and a sub-band of black, 24 pixels high with an 8 pixel high gap between any two adjacent sub-bands. As indicated in FIG. 6, each pixel has a binary value indicating the presence or absence, at the pixel's location, of the sub-band color in which the pixel is located.

When printed, each sub-band is thus $24/360$ inch high, and a vertical separation of $32/360$ inch exists between the top of each sub-band and the top of the next adjacent sub-band. Therefore, in order to print a full page, a band such as shown in FIG. 6 is printed, and then the output paper is moved up $24/360$ inch relative to the printer head. These steps are repeated until an entire page has been printed.

As noted above, printing occurs in alternating color and black-only passes. The first pass is initialized to be a color pass, assuming that color (yellow, magenta or cyan) data is present in the current band. If the current pass is a color pass, then in step S701, only the yellow, magenta and cyan sub-bands are input. On the other hand, if this is a black pass, only the black sub-band is input.

In step S702, CPU 1 stores the input data into RAM 3. Specifically, for a color pass, assuming the print buffer is to be read from left to right, the print buffer is constructed as shown in FIG. 8A. For a black pass, the print buffer is constructed as shown in FIG. 8B. In FIGS. 8A and 8B, an "X" indicates that the bits in that byte have indeterminate values. Of course it is possible to write specific values, such as zeroes, into those memory locations, but that would consume additional processing time, and as discussed below, is unnecessary.

Therefore, upon completion of step S702, the print buffer contains the same data as the bit map of the image band illustrated in FIG. 6. However, in contrast to the situation where printing is performed using a 128 bit printer head, the image data in the print buffer is arranged differently than the bit map data for the image band to be printed. This is especially noticeable for the print buffer of the color pass, as can be seen by comparing FIGS. 8A and 6. In addition, it is noted that bytes 0–7 for the color pass contain all zeroes which serve as padding, the purpose of which will become apparent below.

In step S703, CPU 1 provides certain control signals 10 to gate array 4. Specifically, CPU 1 outputs a signal indicating the pattern in which gate array 4 is to read bit data from the print buffer, a starting address from which to begin reading, a buffer reading direction, and a signal indicating the masking word to be used by gate array 4.

Figure 2A:
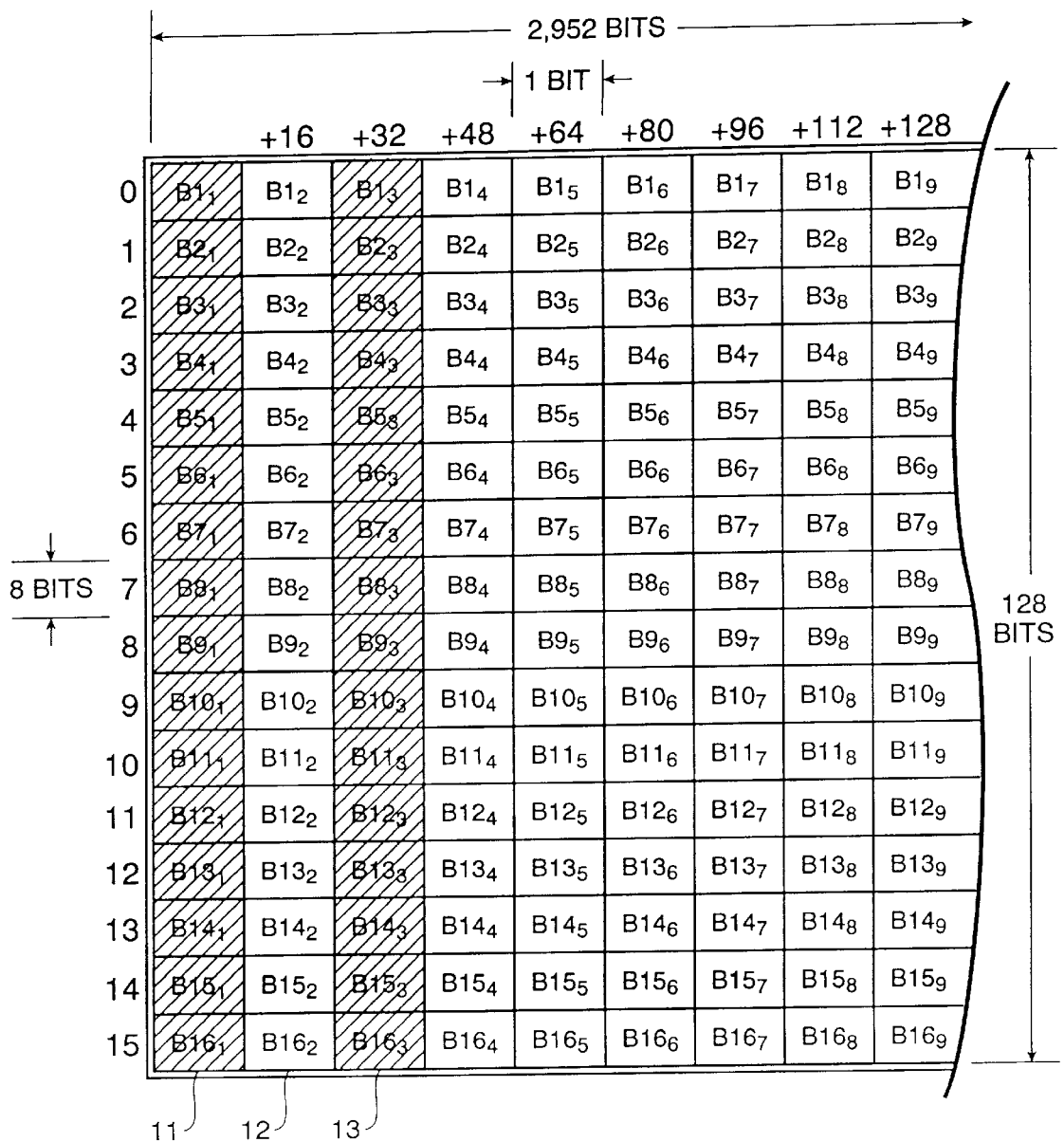
FIG. 2A graphically depicts a portion of a print buffer, and illustrates a pattern column.
Figure 2B:
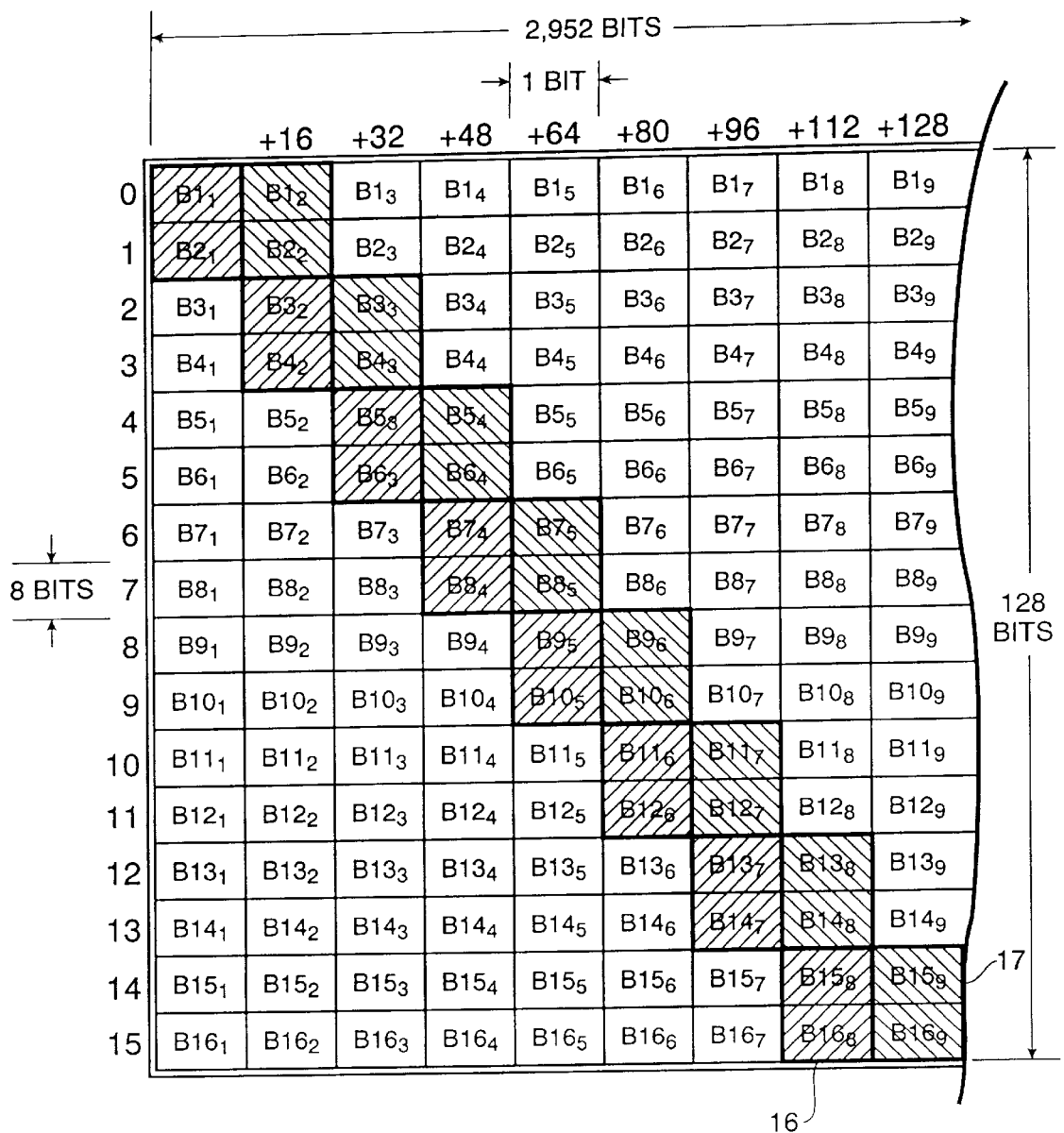
FIG. 2B graphically depicts a portion of a print buffer, and illustrates a staircase pattern.
Figure 2C:
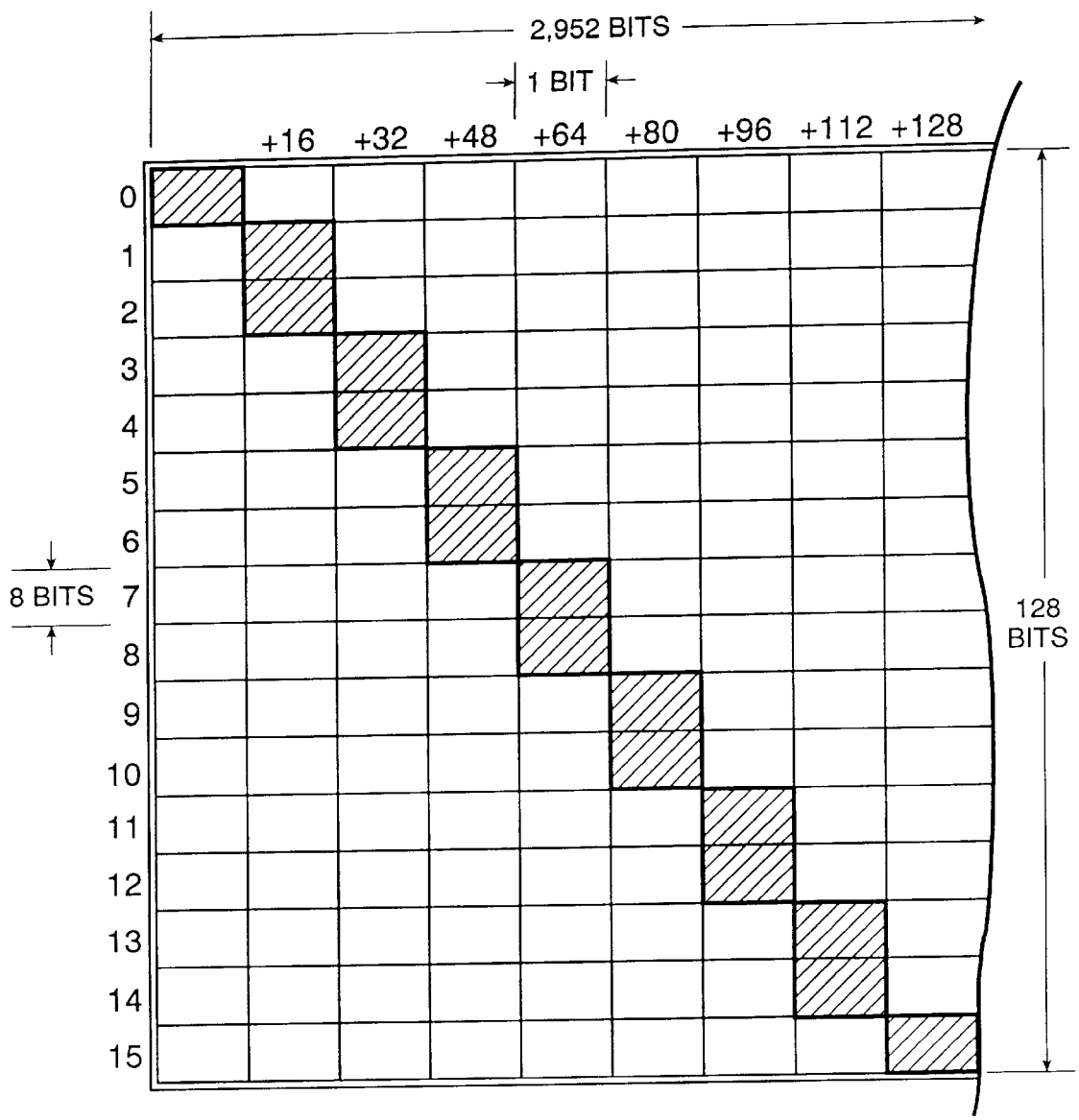
FIG. 2C graphically depicts a portion of a print buffer, and illustrates an alternate staircase pattern.

With respect to the pattern signal, as noted above, gate array 4 is capable of reading data in the column pattern of FIG. 2A, the staircase pattern of FIG. 2B, and the staircase pattern of FIG. 2C. In this embodiment, CPU 1 provides an instruction to gate array 4 to read bit data sequences in the column pattern of FIG. 2A.

As to the masking word for a color pass, step S703 sets bits 8–14 of the masking word to 0, and sets bits 0–7 and 15 to 1. Accordingly, during the masking operation, the yellow, magenta and cyan data shown in FIG. 8A will pass through unaffected, and the remainder of the data (which includes the black data and the indeterminate values) will be forced to 0. During a black pass, step S703 sets bits 0–7 and 11–15 to 0 and bits 8–10 to 1, thereby masking all the data in each bit data sequence other than the band of black image data.

During step S704, CPU 1 sets the yellow enable signal 101 and the black enable signal 102 as follows:

| Status | Yellow Enable | Black Enable |
| --- | --- | --- |
| color pass; first bit data sequence | 0 | 0 |
| color pass; all other bit data sequences | 1 | 0 |
| black pass | 0 | 1 |

In step S705, gate array 4 reads a sequence of bit data from the print buffer in RAM 3 according to the pattern signal provided by CPU 1. Thus, in the present embodiment, one column of data is read from the print buffer beginning at the starting address provided by CPU 1, or for subsequent bit data sequences, the address corresponding to the beginning of the next sequence. In the preferred embodiment, gate array 4 includes a clearing function which automatically sets print buffer locations to 0 after they have been read, and CPU 1 instructs gate array 4 to perform the clear function.

In step S706, gate array 4 masks the read bit data sequence according to the masking word input from CPU 1, as described above.

In step S707, gate array 4 serially outputs the masked bit data sequence to the printer head. Specifically, each bit in the masked bit data sequence is output to printer head 50 in synchronism with clock signal 7a, while shift register 56 in printer head 50 shifts the previously input data one bit at a time, also in synchronism with clock signal 7a. Thus, referring to the data in one byte blocks, byte 0 of the masked bit data sequence initially is loaded into byte 16 of the shift register shown in FIG. 5. Next, byte 1 of the masked bit data sequence is loaded into byte 16 of the shift register, shifting byte 0 of the masked bit data sequence into byte 15 of the shift register. This process continues for each bit in the 128 bit masked bit data sequence.

In step S709, after completing the 128 bit transfer, gate array 4 outputs a latch signal 7b which causes printer head 50 to latch the bit data in shift register 56 into latch register 59. This latching is identical to that described above for printer head 5, except that 17 bytes, rather than 16, are latched. As shown in FIG. 5, the data in bytes 0 to 16 in shift register 56 are transferred to respective bytes 0 to 16 in latch register 59.

In step S710, gate array 4 outputs heat profile signal 7d and timing controls signals 7c in order to print an array of dots based on the data in latch register 59. However, because the output of AND gate 104 is provided to the Y terminal of printer head 50 and the output of AND gate 105 is provided to the B terminal, yellow enable signal 101 and black enable signal 102 control whether the yellow and black nozzles, respectively, are capable of printing at all. The effects of these controls are explained in more detail below.

In step S711, CPU 1 determines whether the array which was just printed is the last bit data sequence in the pass. If not, processing returns to step S704 where CPU 1 updates the yellow and black enable signals in preparation for the next bit data sequence. On the other hand, if this is the last bit data sequence in the pass, processing proceeds to step S712.

In step S712, CPU 1 sets a flag indicating that the buffer will be read in the opposite direction and that the printer head will be moved in the opposite direction. This step increases efficiency by permitting printing during both forward and reverse passes of the printer head.

In step S714, the pass type is toggled. That is, if the previous pass was a color pass, then the current pass is set to be a black pass. On the other hand, if the previous pass was a black pass, then the current pass is set to be a color pass. In addition, during this step the paper is advanced 24/360 inch relative to the printer head if the new pass is a color pass. Thus, when both a color pass and a black pass have been printed, the output page is advanced so as to print a new image band as shown in FIG. 6.

In step S715, a determination is made whether the current band is the last band of image data for the page. If it is, then processing ceases for the current page and the current page is ejected. Otherwise, processing proceeds to step S716.

In step S716, it is determined whether any information exists in the current band to be printed. If no information is available for the current band, then processing returns to step S714 where the pass type is updated. Otherwise, processing proceeds to step S701 to input the next band of input data. Thus, for example, if the current pass is a color pass, and no color information is to be printed for that pass, then the current color pass is skipped, and the next black pass is performed.

The following discussion tracks the contents of shift register 56 and their effects on the printing results for the first few bit data sequences read out of the print buffer during a color pass, assuming that the print buffer is read from left to right. In this regard, FIG. 9A shows the contents of shift register 56 after the data from the first column of FIG. 8A has been masked and serially loaded into shift register 56. Specifically, bytes 1 to 16 of shift register 56 contain the masked data from the first column of the print buffer. Due to the masking operation, shift register bytes 12–15 contain all zeroes, even though the corresponding print buffer bytes have indeterminate values. Moreover, since shift register 56 is 17 bytes long and each column in the print buffer is only 16 bytes long, byte 0 of shift register 56 contains indeterminate values.

As noted above, because this is the first bit data sequence read, during step S704, both yellow enable signal 101 and black enable signal 102 were set to 0. Accordingly, the printer head nozzles corresponding to bytes 0 to 2 and 9 to 16 will be suppressed from printing. Moreover, since the remaining bits all have values of zero, no dots will be printed for this first bit data sequence.

FIG. 9B shows the contents of shift register 56 after the second bit data sequence has been loaded. Bytes 1 to 16 of shift register 56 now correspond to the masked data from the second column with the print buffer shown in FIG. 8A. In addition, Y1₁ in byte 16 in FIG. 9A has now been shifted 16 bytes to byte 0 in FIG. 9B. Due to the masking operation, shift register bytes 12–15, whose corresponding print buffer bytes have indeterminate values in FIG. 8A, contain all zeroes. For the same reason, shift register bytes 9–11, which correspond to print buffer bytes B1₁–B3₁ in FIG. 8A, contain all zeroes. For this bit data sequence, yellow enable signal 101 is set to 1 and black enable signal 102 is set to 0. Accordingly, when the contents of the register shown in FIG. 9B are ultimately printed, bytes 0 to 8 will be printed and bytes 9 to 16 will be suppressed. Thus, the printed dots for this bit data sequence correspond exactly to the color components (yellow, magenta and cyan) in the first column of the image band shown in FIG. 6.

FIG. 9C shows the contents of shift register 56 after the third column of the print buffer shown in FIG. 8A has been loaded. Now, byte Y1₂ has been shifted from byte 16 to byte 0, and bytes 1 to 16 correspond to the third column of the print buffer shown in FIG. 8A, except that the data corresponding to shift register bytes 9–15 have been masked out to 0. Once again, since yellow enable is set to 1 and black enable is set to 0, only bytes 0 to 8 will be printed. This printed array therefore corresponds exactly to the second column of the image band shown in FIG. 6. Thus, continuing in this manner, the color sub-bands (yellow, magenta and cyan) for the entire image band shown in FIG. 6 are printed.

FIGS. 10A and 10B show the contents of shift register 56 for the first two bit data sequences of the black pass, assuming that the buffer is being read from right to left. Specifically, as shown in FIG. 10A, column N of the print buffer shown in FIG. 8A has been masked to zero out everything except the three bytes of black information, and then loaded into bytes 1 to 16 of shift register 56. Byte 0 contains indeterminate values. However, since yellow has been disabled, only bytes B1_N to B3_N will be printed. This corresponds exactly to the last column of the black sub-band of the image band shown in FIG. 6.

FIG. 10B shows the contents of shift register 56 after the second bit data sequence of the black pass has been loaded. Specifically, the contents of byte 16 shown in FIG. 10A (all zeros) have been shifted to byte 0. Bytes 1 to 16 reflect the contents of column N−1 of the print buffer shown in FIG. 8B, as masked. It is noted that although yellow is disabled for this bit data sequence, it does not have to be since shift register bytes 0 to 2 contain all zeros. When the contents of the register shown in FIG. 10B are printed, the results will correspond exactly to column N−1 of the black sub-band in the image band shown in FIG. 6. Continuing in this manner, the entire black sub-band will be printed.

Figure 11:
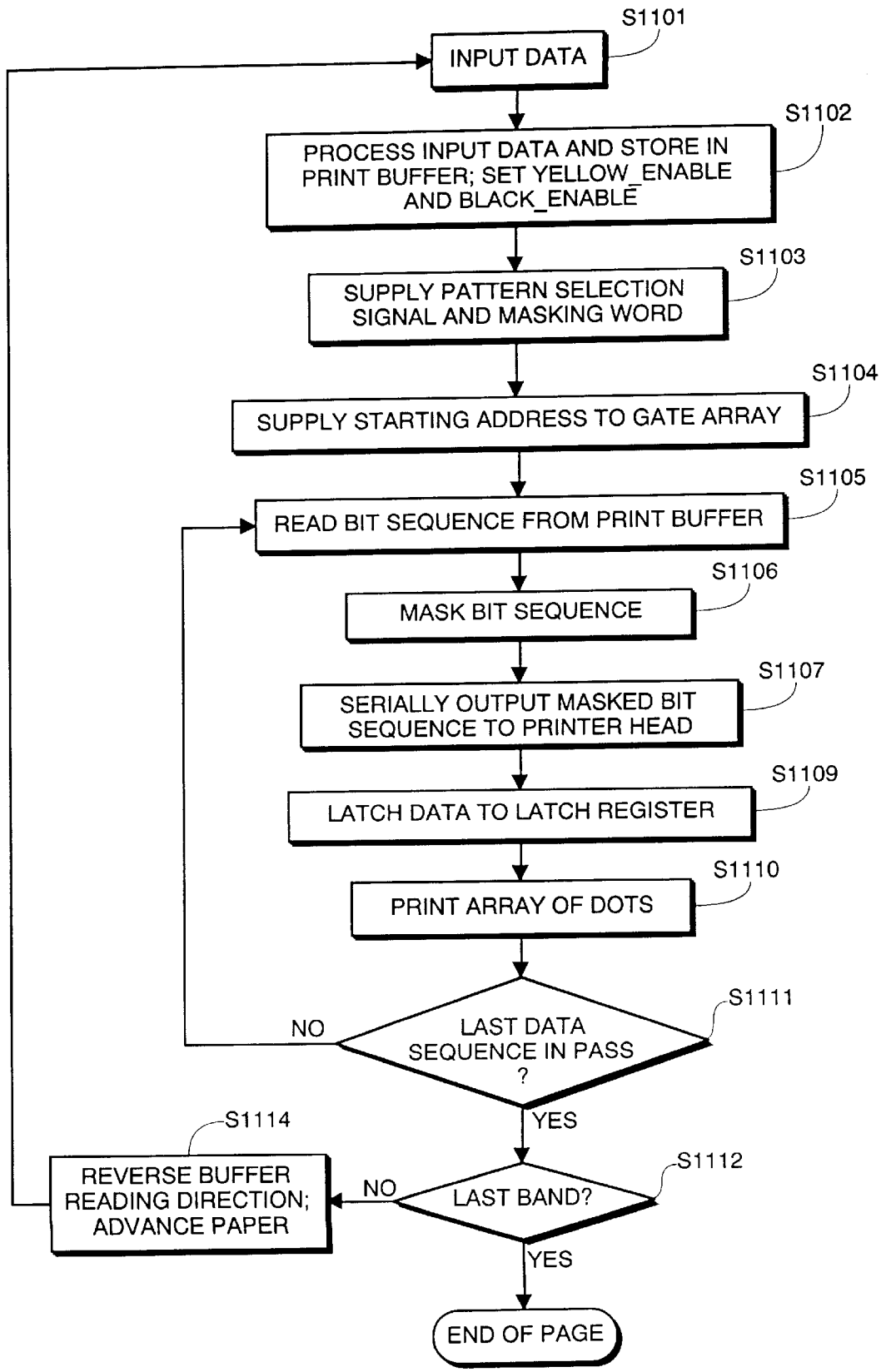
FIG. 11 is a flow diagram of an all-black printing mode according to a first embodiment of the invention.

The all-black printing mode of the first embodiment will now be discussed with reference to FIGS. 11, 12, 13A and 13B. FIG. 11 is a flow diagram illustrating the all-black printing mode of the current embodiment. Briefly, an image band of black image data is input and stored into a print buffer, and then a gate array reads a bit data sequence corresponding to a column of the print buffer, masks the bit data sequence according to a predetermined masking word, and serially outputs the masked data to a shift register in the printer head. The bit data is then latched to a latch register, and an array of dots corresponding to the image data is printed. The foregoing steps are repeated for each column of the print buffer. When the end of the print buffer is reached, a new band is input and read in the opposite direction as the previous band, so that the printer head prints one band as it moves across the page from left to right and then the next as it moves back from right to left. Consecutive bands are printed in this manner so as to print the entire page.

More specifically, in step S1101, CPU 1 inputs a 64 pixel high band of all black image data to be printed, such as from an external word processing application.

In step S1102, CPU 1 stores the input data into RAM 3 as shown in FIG. 12. In this case, the image data in the print buffer is arranged in the same manner as the bit map data for the image band to be printed, and occupies the bottom eight rows of the print buffer. The remainder of the buffer positions have indeterminate values.

During step S1102, CPU 1 also sets the yellow enable signal 101 to 0 and the black enable signal 102 to 1.

In step S1103, CPU 1 provides a signal indicating the pattern in which gate array 4 is to read bit data from the print buffer, as well as a signal indicating the masking word to be used by gate array 4. Similar to the color mode, in the all-black mode of this embodiment, CPU 1 provides an instruction to gate array 4 to read bit data sequences in the column pattern shown in FIG. 2A.

As to the masking word, step S1103, sets bits 0–7 of the masking word to 0, and sets bits 8–15 to 1. Accordingly, during the masking operation, only the black image data will pass through unaffected and the remainder of the data in the buffer (which have indeterminate values) will be forced to 0.

In step S1104, CPU 1 provides to gate array 4 an address in RAM 3 from which gate array 4 is to begin reading the current bit data sequence and the direction (forward or reverse) in which to read the print buffer.

In step S1105, gate array 4 reads a sequence of bit data from the print buffer in RAM 3 according to the pattern signal provided by CPU 1. Thus, in the present embodiment, one column of data is read from the print buffer beginning at the starting address provided by CPU 1, or for subsequent bit data sequences, at the address corresponding to the next sequence to be read.

In step S1106, gate array 4 masks the read bit data sequence according to the masking word input from CPU 1, as described above.

In step S1107, gate array 4 serially outputs the masked bit data sequence to the printer head, as described for step S707.

In step S1109, after completing the 128 bit transfer, gate array 4 outputs a latch signal 7b which causes printer head 50 to latch the bit data in shift register 56 into latch register 59.

In Step S1110, gate array 4 outputs heat profile signal 7d and timing controls signals 7c in order to print an array of dots based on the data in latch register 59, subject, however, to the suppression effects of the yellow enable signal 101 described above.

In step S1111, CPU 1 determines whether the array which was just printed is the last bit data sequence in the pass. If not, processing returns to step S1105 where gate array 4 reads the next bit data sequence. On the other hand, if this is the last bit data sequence in the pass, processing proceeds to step S1112.

In step S1112, CPU 1 determines whether the current band was the last band for the page. If it is not, then processing proceeds to step S1114 to advance the output page $^{64}/_{360}$ inch and to reverse the buffer reading direction and the direction in which the printer head will be moved. This provides additional efficiency by permitting printer head 50 to print in forward and reverse directions. After completion of step S1114, processing proceeds to step S1101 to input the next image band to be printed.

If, on the other hand, the current band was the last band, then processing is completed for the page and the paper is ejected.

By virtue of the foregoing processing, the all-black printing mode of the present embodiment utilizes all 64 black nozzles of printer head 50, and also performs printing in both the forward and reverse directions, thereby further enhancing printer efficiency. The all-black printing mode can also be implemented using less than all 64 print nozzles. For example, it is often preferable to perform 60 nozzle all-black printing. In this case, only 60 bits of the print buffer are used.

It is noted that the color mode and the all-black mode are not necessarily mutually exclusive. For example, during color printing, if CPU 1 determines that a portion of image data to be printed consists only of black information, then the processing can be changed to the all-black mode at least until a portion of the page is reached for which color image data is to be printed.

The contents of shift register 56, and the corresponding printer output, for the first two bit data sequences read out of the print buffer during the all-black mode will now be described with reference to FIGS. 13A and 13B, assuming that the print buffer shown in FIG. 12 is being read from left to right. Initially, the first column of the print buffer shown in FIG. 12 is loaded into shift register 56. More specifically, byte 0 of shift register 56 will contain indeterminate values, and bytes 1 to 16 will contain data corresponding to the first column data, as masked. However, since yellow enable signal 101 is set to 0, only the data corresponding to bytes $B1_1$ to $B8_1$ will be printed. This, of course, is exactly the first column of data in the image band to be printed.

When the next bit data sequence is shifted into shift register 56, the contents of shift register 56 will appear as shown in FIG. 13B. Specifically, byte $B8_1$ will be shifted from byte 16 to byte 0 of shift register 56. Bytes 1 to 16 of shift register 56 will correspond to the masked image data in the second column of the print buffer shown in FIG. 12. Once again, since yellow enable signal 101 is set to 0, only the information corresponding to bytes $B1_2$ to $B8_2$ will be printed. This corresponds exactly to the second column of the image band to be printed. Accordingly, continuing in this manner, the entire image band will be printed.

[Second Embodiment]

Figure 14A:
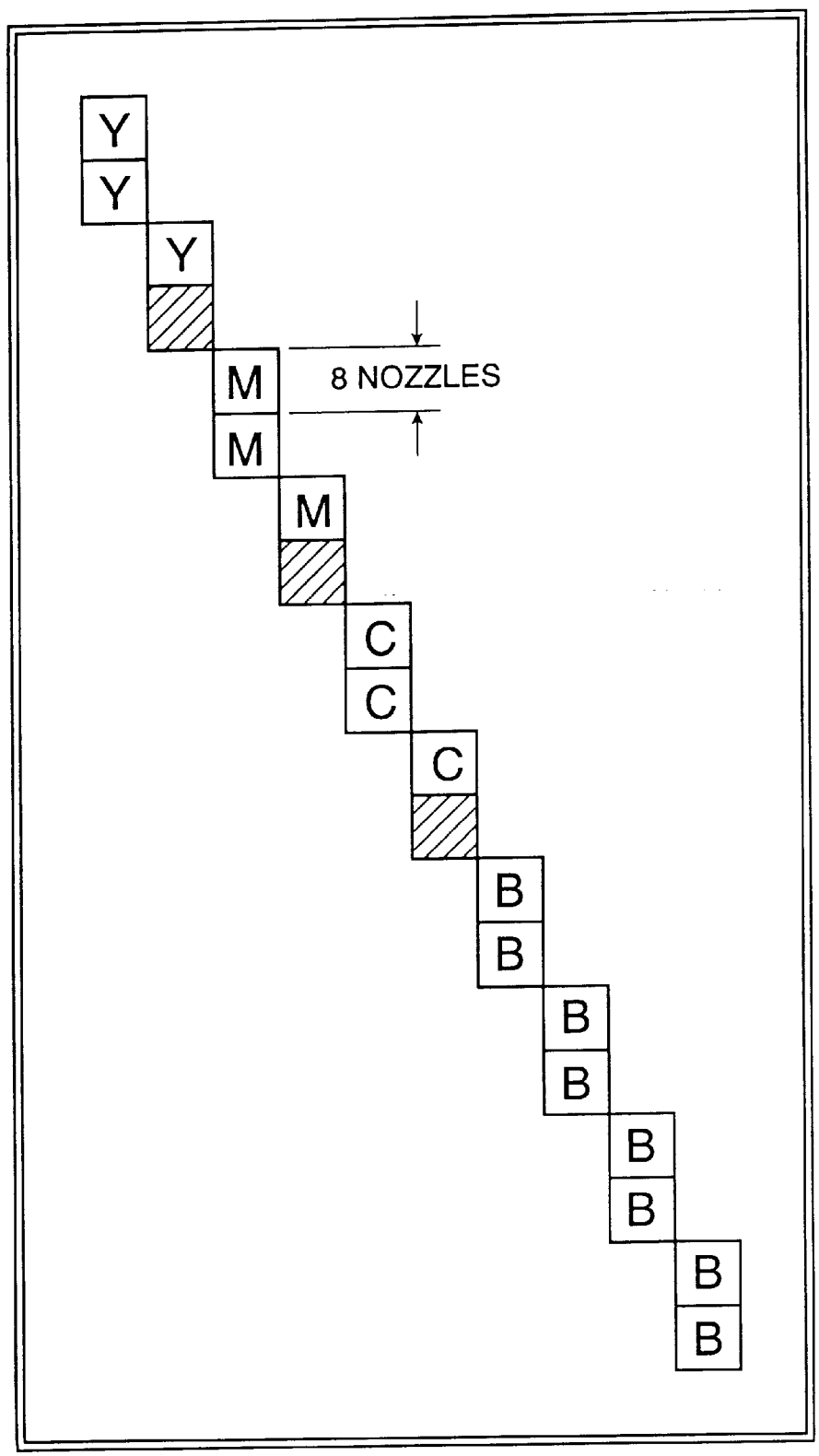
FIG. 14A shows the arrangement of nozzles in a printer head used in the second embodiment of the invention.

A second embodiment of the present invention will now be described. Like the first embodiment, this embodiment provides a printing technique which can be used with gate array 4 shown in FIG. 1 to enable printing using a 136 nozzle color printer head. However, in this embodiment, the nozzles in printer head 50 are arranged in a manner different from that of the first embodiment. The arrangement of printer nozzles in this embodiment is depicted in FIG. 14A; the printer head in this embodiment still has 24 yellow nozzles, a gap of eight nozzles, 24 magenta nozzles, another gap of eight nozzles, 24 cyan nozzles, another gap of eight nozzles, and 64 black nozzles. However, in this embodiment, the nozzles are arranged in a staircase pattern.

Figure 14B:
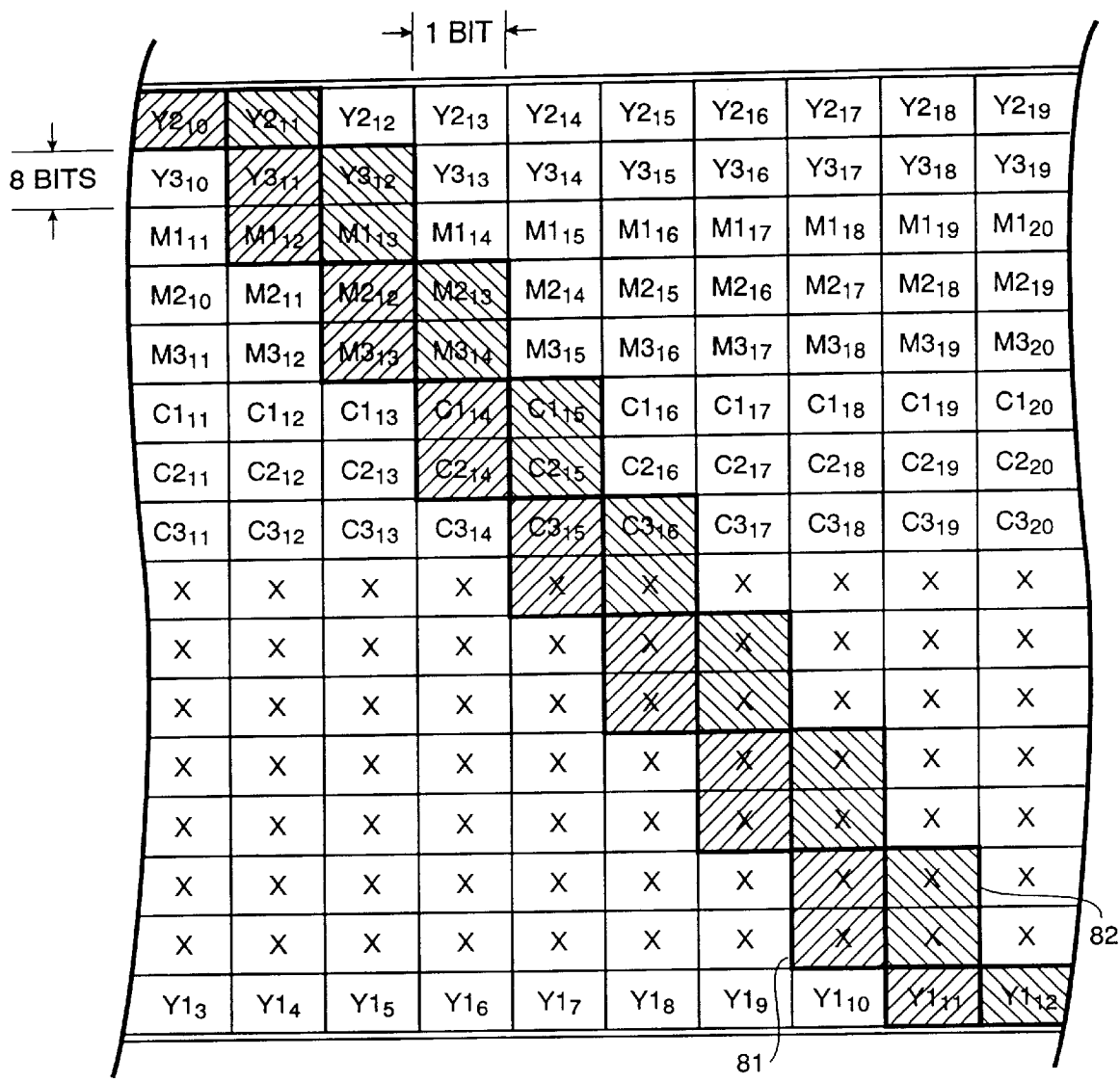
FIG. 14B illustrates the arrangement of data in the print buffer for a color pass of the color printing mode in the second embodiment of the invention.
Figure 14C:
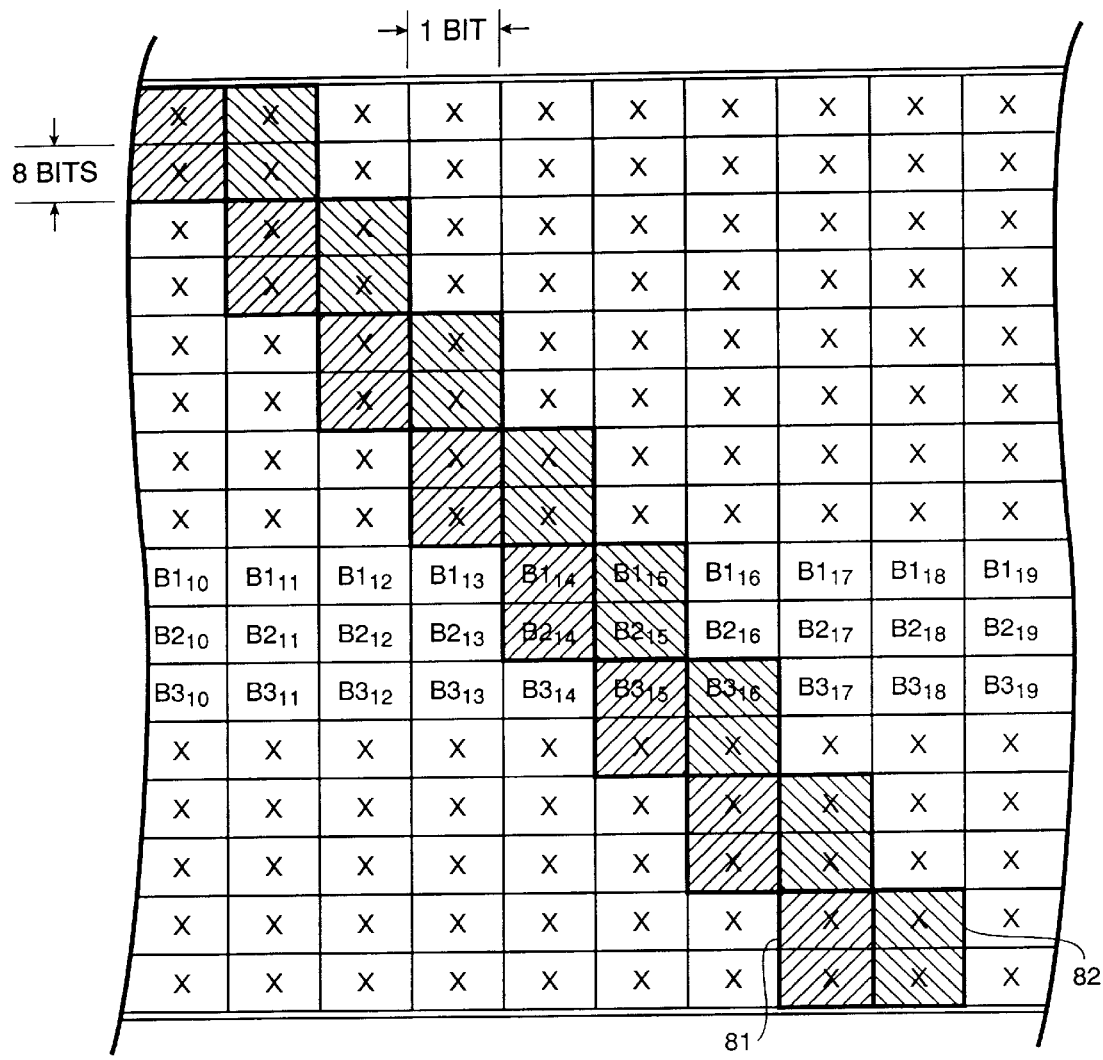
FIG. 14C illustrates the arrangement of data in the print buffer for a black pass of the color printing mode in the second embodiment of the invention.

As in the previous embodiment, a desired combined color and black image band to be printed will be configured as shown in FIG. 6. In addition, the printing technique in this embodiment is identical to that of the first embodiment, except for the following changes. In step S702, CPU 1 constructs the print buffer as shown in FIGS. 14B (assuming the print buffer is to be read from left to right) and 14C, rather than FIGS. 8A and 8B, respectively. In step S703, for a color pass, CPU 1 provides a pattern signal corresponding to the staircase pattern shown in FIG. 2C, rather than the column pattern of FIG. 2A, and accordingly, gate array 4 reads bit data sequences according to the FIG. 2C pattern. For a black pass in step S703 and for step S1103, CPU 1 provides a signal corresponding to the staircase pattern shown in FIG. 2B, rather than the column pattern of FIG. 2A, and accordingly, gate array 4 reads bit data sequences according to the FIG. 2B pattern. Finally, if it is desired to print a rectangular band of image data in this embodiment, additional zero padding at the beginning and end of the print buffer will be required.

Other than the foregoing changes, which accommodate the different printer head nozzle configuration, both the color printing mode and the all-black printing mode of this embodiment are identical to the first embodiment.

In both the first and second embodiments, it is preferable that the 136 nozzle color printer head 50 be physically interchangeable with the 128 nozzle monochrome printer head 5.

The invention has been described with respect to particular illustrative embodiments. However, it is to be understood that the invention is not limited to the above described embodiments and that various changes and modifications may be made by those of ordinary skill in the art without departing from the spirit and scope of the invention.

For example, the foregoing color printing techniques enable a printer to print using a printer head having 136 nozzles, even though the printer can only output 128 bits of image data at a time. This is accomplished by dividing an image band to be printed into a number of pixel arrays, with the pixels in each array arranged similarly to at least a portion of the nozzles in the printer head.

In the foregoing embodiments, data corresponding to a group of pixels beginning after the first n pixels in one pixel array, as well as the first n pixels in the next adjacent pixel array, are serially output together. Of course, the meanings of "first" and "next" as used in the previous sentence are not fixed, but will depend upon the order in which data is being read out of the print buffer. By appropriately selecting the data in this way, once the output data is shifted into a shift register in the printer head, the arrangement of data in the shift register can be made to correspond exactly to one of the pixel arrays in the image band.

To achieve this result in the above described embodiments, bit map data for an image to be printed is appropriately arranged in the print buffer, and appropriate starting addresses, pattern signals, color enable signals and masking words are supplied. However, the specific manner of arranging the image band data in the print buffer, and the specific starting addresses, pattern signals, etc. used herein are not absolutely required, and many variations to achieve the same result will be apparent to those skilled in the art. For example, by performing appropriate mapping, the print buffer in the second embodiment might instead be constructed so that each bit data sequence to be read is contained in one column of the print buffer, in which case the pattern signal provided by CPU 1 would indicate the column pattern shown in FIG. 2A. Similarly, entirely different methods can be used to achieve the same result of outputting data corresponding to pixels from one array together with data corresponding to pixels from another array.

Moreover, although the above embodiments have been described with respect to a Canon Bubblejet printer head, the invention can be used in connection with other printer heads, such as electrothermal ink jet, piezo ink jet, laser ink jet, thermal transfer, thermal sensitive, and dot matrix printer heads. In addition, although the above embodiments use printer heads which scan across a page, the invention can also be used with printer heads which print a full line of image data at a time. Finally, although the above embodiments have been described with respect to printing on an output paper using liquid ink, the technique is also applicable to printing on film, textiles or other media, and using other recording materials such as solid inks and thermal transfer materials.

What is claimed is:

1. A method for printing using a printer which loads and shifts to a shift register of a printer head a fixed number of bits at a time so as to permit the printer to use a printer head having a number of nozzles which is different than the fixed number of bits, said method comprising:

obtaining bit data corresponding to an image band to be printed, the image band comprising plural pixel arrays, each having a plurality of pixels, the pixels in each pixel array being arranged in a manner corresponding to a plurality of the nozzles in the printer head;

loading data bits into the shift register of the printer head for printing an i-th pixel array of the image band, the shift register accommodating a different number of data bits than the fixed number of bits, said loading comprising:

a first loading step of loading into the shift register bit data for m said pixels in the i-th said pixel array, m being a predetermined integer, and i being an arbitrary integer; and a second loading step of loading into the shift register bit data for n said pixels in an (i+1)-th said pixel array, n being a predetermined integer; and causing the printer head to print an array of dots based on contents of the shift register which includes the bit data loaded pursuant to said first and second loading steps, the printed array of dots corresponding to the i-th pixel array, with printing for at least some of the n bits of the (i+1)-th pixel array being disabled.

2. A printing method according to claim 1, wherein in the first loading step the m pixels of the i-th pixel array begin with the (n+1)-th pixel, wherein in the second loading step the loaded n pixels of the (i+1)-th pixel array are the first n pixels, and wherein the second loading step is performed after the first loading step.

3. A printing method according to claim 1, wherein the length of each of the i-th and (i+1)-th pixel arrays is m+n pixels.

4. A printing method according to claim 1, wherein the (i+1)-th pixel array is a next pixel array printed after the i-th pixel array.

5. A printing method according to claim 4, wherein the first loading step, the second loading step, and the printing step are repeated in sequence plural times, and each time a value of i is incremented by one.

6. A printing method according to claim 5, wherein the bit data include color information and black information, and wherein the first loading step, the second loading step, and the printing step are repeated so as to print the color information for substantially all of the band.

7. A printing method according to claim 6, further comprising a step of supplying a black control signal to the printer head to suppress printing of both the first n pixels of the (i+1)-th pixel array and the black information.

8. A printing method according to claim 6, wherein only the color information is printed during a first pass of the printer head and only the black information is printed during a second pass of the printer head.

9. A printing method according to claim 8, further comprising a step of supplying a yellow control signal to the printer head to suppress printing of yellow information during the second pass of the printer head.

10. A printing method according to claim 1, wherein the first and the second loading steps are performed by reading a single bit data sequence from a print buffer, wherein the bit data sequence is read from the print buffer according to a predetermined pattern which corresponds to an arrangement of the nozzles in the printer head.

11. A printing apparatus for recording using a printer head comprising:

a RAM for storing a band of bit image data to be printed, the band comprising plural pixel arrays, each having a plurality of pixels; and an output means for reading, according to a predetermined pattern, a fixed number of data bits in a sequence of bit data from the bit image data stored in the RAM, for serially outputting and shifting the sequence of bit data to a shift register in the printer head, the shift register accommodating a different number of data bits than the fixed number of data bits, and for providing at least one control signal to the printer head so as to print an array of dots based on the sequence of bit data contained in the shift register with printout of at least some of the bit data contained in the shift register being disabled, wherein, the sequence of bit data output to the shift register is for printing an i-th pixel array of the image band, wherein a first m bits serially output to the shift register correspond to bit image data for an i-th said pixel array in the band of the bit image data to be printed, wherein a last n bits output to the shift register correspond to bit image data for an (i+1)-th said pixel array in the band, and wherein the printed array of dots corresponds to the i-th pixel array.

12. A printing apparatus according to claim 11, wherein the sequence that is read by the output means has a predetermined length and corresponds to a bit pattern in the band which is similar to a pattern of a plurality of nozzles in the printer head.

13. A printing apparatus according to claim 11, wherein the output means serially outputs the sequence of bit data by outputting the m said pixels of the i-th pixel array beginning with the (n+1)-th pixel, and thereafter outputting the first n said pixels of the (i+1)-th pixel array.

14. A printing apparatus according to claim 11, wherein the length of each of the i-th and (i+1)-th pixel arrays is m+n pixels.

15. A printing apparatus according to claim 11, wherein the (i+1)-th pixel array is a next pixel array printed after the i-th pixel array.

16. A printing apparatus according to claim 15, wherein the output means repeats plural times a cycle of reading the sequence of bit data from the bit image data stored in the RAM, serially outputting the sequence of bit data to the printer head, and providing the control signal to the printer head so as to print an array of dots corresponding to the i-th pixel array based on the sequence of bit data, and each time a value of i is incremented by one.

17. A printing apparatus according to claim 16, wherein the bit image data include a color information and a black information, and wherein the cycle is repeated so as to print the color information for substantially all of the band.

18. A printing apparatus according to claim 17, further comprising a processing means for outputting a black enable signal which is used in conjunction with the control signal to suppress printing the black information and bit image data for the (i+1)-th pixel array.

19. A printing apparatus according to claim 18, wherein the processing means causes a first pass of the printer head during which only the color information is printed and causes a second pass of the printer head during which only the black information is printed.

20. A printing apparatus according to claim 19, wherein the processing means also outputs a yellow enable signal which is used in conjunction with the control signal to suppress printing the yellow information during the second pass of the printer head.

21. A printing apparatus according to claim 11, wherein the predetermined pattern in accordance with which the sequence of bit data is read corresponds to an arrangement of a plurality of nozzles in the printer head.

22. A method for printing using a printer which reads and then outputs to a printer head a fixed number of bits at a time so as to permit the printer to use a printer head having a number of nozzles which is different than the fixed number of bits, said method comprising:

obtaining bit data corresponding to an image band to be printed, the image band comprising plural pixel arrays, each having a plurality of pixels, the pixels in each pixel array being arranged in a manner corresponding to a plurality of the nozzles in the printer head;

a first loading step of loading into a register in the printer head bit data for m said pixels in an i-th said pixel array, m being a predetermined integer, and i being an arbitrary integer;

a second loading step of loading into the register in the printer head bit data for n said pixels in an (i+1)-th said pixel array, n being a predetermined integer; and causing the printer head to print an array of dots based on contents of a register which includes the bit data loaded pursuant to said first and second loading steps, the printed array of dots corresponding to the i-th pixel array, wherein in the first loading step the m pixels of the i-th pixel array begin with the (n+1)-th pixel, wherein in the second loading step the loaded n pixels of the (i+1)-th pixel array are the first n pixels, and wherein the second loading step is performed after the first loading step.

23. A printing method according to claim 22, wherein the length of each of the i-th and (i+1)-th pixel arrays is m+n pixels.

24. A printing method according to claim 22, wherein the (i+1)-th pixel array is a next pixel array printed after the i-th pixel array.

25. A printing method according to claim 24, wherein the first loading step, the second loading step, and the printing step are repeated in sequence plural times, and each time a value of i is incremented by one.

26. A printing method according to claim 25, wherein the bit data include color information and black information, and wherein the first loading step, the second loading step, and the printing step are repeated so as to print the color information for substantially all of the band.

27. A printing method according to claim 26, further comprising a step of supplying a black control signal to the printer head to suppress printing of both the first n pixels of the (i+1)-th pixel array and the black information.

28. A printing method according to claim 26, wherein only the color information is printed during a first pass of the printer head and only the black information is printed during a second pass of the printer head.

29. A printing method according to claim 28, further comprising a step of supplying a yellow control signal to the printer head to suppress printing of yellow information during the second pass of the printer head.

30. A printing method according to claim 22, wherein the first and the second loading steps are performed by reading a single bit data sequence from a print buffer, wherein the bit data sequence is read from the print buffer according to a predetermined pattern which corresponds to an arrangement of the nozzles in the printer head.

31. A printing apparatus for recording using a printer head comprising:

a RAM for storing a band of bit image data to be printed, the band comprising plural pixel arrays, each having a plurality of pixels; and an output means for reading, according to a predetermined pattern, a sequence of bit data from the bit image data stored in the RAM, for serially outputting the sequence of bit data to the printer head, and for providing at least one control signal to the printer head so as to print an array of dots based on the sequence of bit data, wherein the first m bits serially output to the printer head correspond to that said bit image data for an i-th said pixel array in the band of the bit image data to be printed, wherein the last n bits output to the printer head correspond to that said bit image data for an (i+1)-th said pixel array in the band, and wherein the printed array of dots corresponds to the i-th pixel array, wherein the output means serially outputs the sequence of bit data by outputting the m said pixels of the i-th pixel array beginning with the (n+1)-th pixel, and thereafter outputting the first n said pixels of the (i+1)-th pixel array.

32. A printing apparatus according to claim 31, wherein the sequence that is read by the output means has a predetermined length and corresponds to a bit pattern in the band which is similar to a pattern of a plurality of nozzles in the printer head.

33. A printing apparatus according to claim 31, wherein the length of each of the i-th and (i+1)-th pixel arrays is m+n pixels.

34. A printing apparatus according to claim 31, wherein the (i+1)-th pixel array is a next pixel array printed after the i-th pixel array.

35. A printing apparatus according to claim 34, wherein the output means repeats plural times a cycle of reading the sequence of bit data from the bit image data stored in the RAM, serially outputting the sequence of bit data to the printer head, and providing the control signal to the printer head so as to print an array of dots corresponding to the i-th pixel array based on the sequence of bit data, and each time a value of i is incremented by one.

36. A printing apparatus according to claim 35, wherein the bit image data include a color information and a black information, and wherein the cycle is repeated so as to print the color information for substantially all of the band.

37. A printing apparatus according to claim 36, further comprising a processing means for outputting a black enable signal which is used in conjunction with the control signal to suppress printing the black information and bit image data for the (i+1)-th pixel array.

38. A printing apparatus according to claim 37, wherein the processing means causes a first pass of the printer head during which only the color information is printed and causes a second pass of the printer head during which only the black information is printed.

39. A printing apparatus according to claim 38, wherein the processing means also outputs a yellow enable signal which is used in conjunction with the control signal to suppress printing the yellow information during the second pass of the printer head.

40. A printing apparatus according to claim 31, wherein the predetermined pattern in accordance with which the sequence of bit data is read corresponds to an arrangement of a plurality of nozzles in the printer head.

* * * * *